(12) United States Patent
Omino

(10) Patent No.: US 11,587,467 B2
(45) Date of Patent: Feb. 21, 2023

(54) ENCRYPTION PROCESSING DEVICE, ENCRYPTION PROCESSING METHOD, AND COMPUTER PROGRAM PRODUCT

(71) Applicant: KABUSHIKI KAISHA TOSHIBA, Tokyo (JP)

(72) Inventor: Tsukasa Omino, Ota Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 14 days.

(21) Appl. No.: 17/181,484

(22) Filed: Feb. 22, 2021

(65) Prior Publication Data
US 2022/0068163 A1 Mar. 3, 2022

(30) Foreign Application Priority Data

Aug. 27, 2020 (JP) .............................. JP2020-143482

(51) Int. Cl.
*H04L 9/06* (2006.01)
*G09C 1/00* (2006.01)

(52) U.S. Cl.
CPC .............. *G09C 1/00* (2013.01); *H04L 9/0631* (2013.01); *H04L 2209/04* (2013.01); *H04L 2209/34* (2013.01)

(58) Field of Classification Search
CPC ..... G09C 1/00; H04L 9/0631; H04L 2209/04; H04L 2209/34; H04L 9/003
See application file for complete search history.

(56) References Cited

U.S. PATENT DOCUMENTS

| 6,940,975 B1 * | 9/2005 | Kawamura | ........... H04L 9/0625 |
| | | | 380/37 |
| 7,764,786 B2 * | 7/2010 | Liardet | ................... H04L 9/003 |
| | | | 713/189 |

(Continued)

FOREIGN PATENT DOCUMENTS

| JP | H10-233921 A | 9/1998 |
| JP | 3600454 B2 | 12/2004 |
| JP | 5364840 B2 | 12/2013 |

OTHER PUBLICATIONS

Herbst, C., Oswald, E., Mangard, S. (2006). An AES Smart Card Implementation Resistant to Power Analysis Attacks. In: Zhou, J., Yung, M., Bao, F. (eds) Applied Cryptography and Network Security. ACNS 2006.*

(Continued)

*Primary Examiner* — David Garcia Cervetti
(74) *Attorney, Agent, or Firm* — Finnegan, Henderson, Farabow, Garrett & Dunner, LLP

(57) ABSTRACT

According to an embodiment, an encryption processing device includes a memory and one or more processors. The memory stores a plurality of divided masks to be applied to an input sentence on which mask processing is performed in unit of processing of a predetermined size corresponding to a size of data obtained by dividing target data of encryption processing into a plurality of pieces, the divided masks having a same size as that of data obtained by further dividing the data of the unit of processing. The one or more processors are configured to: read out the plurality of divided masks from the memory at different respective timings, and generate a plurality of first masks by using the read-out divided masks at different respective timings; and execute arithmetic processing on intermediate data of the encryption processing using the plurality of first masks at different respective timings.

10 Claims, 28 Drawing Sheets

(56) References Cited

U.S. PATENT DOCUMENTS

| | | | | |
|---|---|---|---|---|
| 8,422,668 | B1* | 4/2013 | Thichina | G06F 21/6209 |
| | | | | 714/755 |
| 8,504,845 | B2* | 8/2013 | Farrugia | G06F 21/52 |
| | | | | 713/189 |
| 10,819,502 | B2* | 10/2020 | Maghrebi | H04L 9/002 |
| 2003/0048903 | A1* | 3/2003 | Ito | H04L 9/003 |
| | | | | 380/263 |
| 2004/0202329 | A1* | 10/2004 | Jung | H04W 76/40 |
| | | | | 380/273 |
| 2005/0207571 | A1* | 9/2005 | Ahn | H04L 9/003 |
| | | | | 380/28 |
| 2005/0232430 | A1* | 10/2005 | Gebotys | H04L 9/003 |
| | | | | 380/286 |
| 2006/0256963 | A1* | 11/2006 | Gebotys | H04L 9/003 |
| | | | | 380/205 |
| 2007/0140478 | A1* | 6/2007 | Komano | H04L 9/0618 |
| | | | | 380/28 |
| 2008/0019503 | A1* | 1/2008 | Dupaquis | H04L 9/002 |
| | | | | 380/28 |
| 2008/0260145 | A1* | 10/2008 | Trichina | H04L 9/003 |
| | | | | 380/46 |
| 2009/0086976 | A1* | 4/2009 | Scian | H04L 9/003 |
| | | | | 380/28 |
| 2010/0054461 | A1* | 3/2010 | Ciet | H04L 9/0618 |
| | | | | 380/29 |
| 2011/0013767 | A1* | 1/2011 | Kim | H04L 9/0618 |
| | | | | 380/28 |
| 2012/0037997 | A1 | 2/2012 | Chen et al. | |
| 2012/0069998 | A1* | 3/2012 | Endo | H04L 9/0631 |
| | | | | 380/46 |
| 2013/0236005 | A1* | 9/2013 | Ikeda | H04L 9/003 |
| | | | | 380/28 |
| 2014/0169553 | A1* | 6/2014 | Chen | G06F 7/726 |
| | | | | 380/28 |
| 2014/0223192 | A1* | 8/2014 | Dent | G06F 21/52 |
| | | | | 713/189 |
| 2015/0058639 | A1* | 2/2015 | Hasegawa | G06F 21/78 |
| | | | | 713/190 |
| 2015/0200772 | A1* | 7/2015 | Yamada | H04L 9/0637 |
| | | | | 380/28 |
| 2015/0244524 | A1* | 8/2015 | Pulkus | G06F 16/2282 |
| | | | | 380/28 |
| 2015/0278555 | A1* | 10/2015 | Melzani | H04L 9/002 |
| | | | | 713/192 |
| 2016/0127123 | A1* | 5/2016 | Johnson | H04L 9/003 |
| | | | | 713/189 |
| 2016/0269175 | A1* | 9/2016 | Cammarota | H04L 9/002 |
| 2017/0010814 | A1* | 1/2017 | Westlund | G06F 3/0679 |
| 2017/0033921 | A1* | 2/2017 | Michiels | G06F 21/14 |
| 2017/0033923 | A1* | 2/2017 | Melzani | H04L 9/003 |
| 2017/0083723 | A1* | 3/2017 | Klug | H04L 9/00 |
| 2017/0118011 | A1* | 4/2017 | Shibutani | H04L 9/14 |
| 2017/0230171 | A1* | 8/2017 | Gadepally | H04L 9/14 |
| 2017/0288855 | A1* | 10/2017 | Kumar | H04L 9/0631 |
| 2017/0353299 | A1* | 12/2017 | Takatsu | H04L 9/0631 |
| 2017/0373831 | A1* | 12/2017 | Wurcker | H04L 9/14 |
| 2017/0373838 | A1* | 12/2017 | Wurcker | H04L 9/002 |
| 2018/0062828 | A1* | 3/2018 | Cioranesco | H04L 9/0618 |
| 2018/0083769 | A1* | 3/2018 | Maghrebi | H04L 9/002 |
| 2018/0097618 | A1* | 4/2018 | Kumar | H04L 9/003 |
| 2018/0167196 | A1* | 6/2018 | Cooper | H04L 9/0631 |
| 2018/0174493 | A1* | 6/2018 | Ohori | H04L 9/0866 |
| 2018/0183576 | A1* | 6/2018 | Wang | H04L 9/0631 |
| 2018/0351729 | A1* | 12/2018 | Tunstall | G06F 21/71 |
| 2019/0199517 | A1* | 6/2019 | Satpathy | H04L 9/065 |
| 2019/0268134 | A1* | 8/2019 | Fronte | H04L 9/0631 |
| 2019/0305930 | A1* | 10/2019 | Bauer | H04L 9/002 |
| 2020/0125333 | A1* | 4/2020 | Vigilant | H04L 9/003 |
| 2020/0322127 | A1* | 10/2020 | Lozac'h | H04L 9/003 |
| 2020/0364377 | A1* | 11/2020 | Cooper | H04L 9/0625 |
| 2020/0396068 | A1* | 12/2020 | Sarno | H04L 9/0894 |
| 2020/0412523 | A1* | 12/2020 | Tunstall | G06F 21/755 |
| 2021/0135838 | A1* | 5/2021 | Gaddam | H04L 9/065 |
| 2021/0150070 | A1* | 5/2021 | Satpathy | G06F 15/7807 |
| 2021/0160055 | A1* | 5/2021 | Tiikkainen | H04L 9/0637 |
| 2021/0165633 | A1* | 6/2021 | Guilley | G06F 7/501 |
| 2021/0391977 | A1* | 12/2021 | Reymond | H04L 9/003 |

OTHER PUBLICATIONS

M. Nassar, Y. Souissi, S. Guilley and J. Danger, "RSM: A small and fast countermeasure for AES, secure against 1st and 2nd-order zero-offset SCAs," 2012 Design, Automation & Test in Europe Conference & Exhibition (DATE), 2012, pp. 1173-1178.*

Benjamin Timon, "Non-Profiled Deep Learning-based Side-Channel attacks with Sensitivity Analysis," International Conference on Cryptographic Hardware and Embedded Systems (CHES), 34 pages (2019).

Shivam Bhasin, et al., "Analysis and Improvements of the DPA Contest v4 Implementation," SPACE '14, LNCS 8804, 18 pages (2014).

Louis Goubin et al., "DES and Differential Power Analysis The 'Duplication' Method," Cryptographic Hardware and Embedded Systems, Lecture Notes in Computer Science, vol. 1717, pp. 158-172 (1999).

* cited by examiner

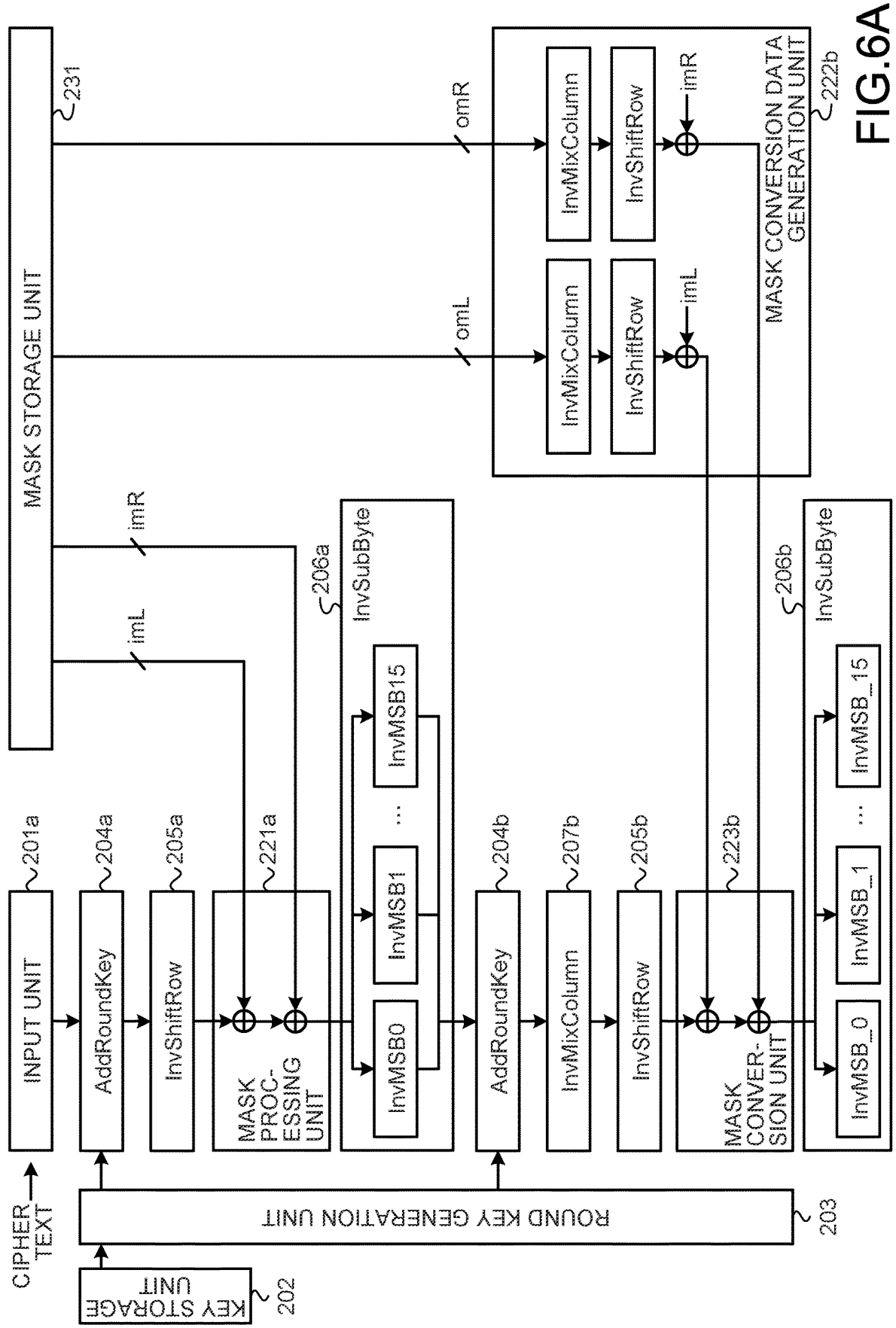

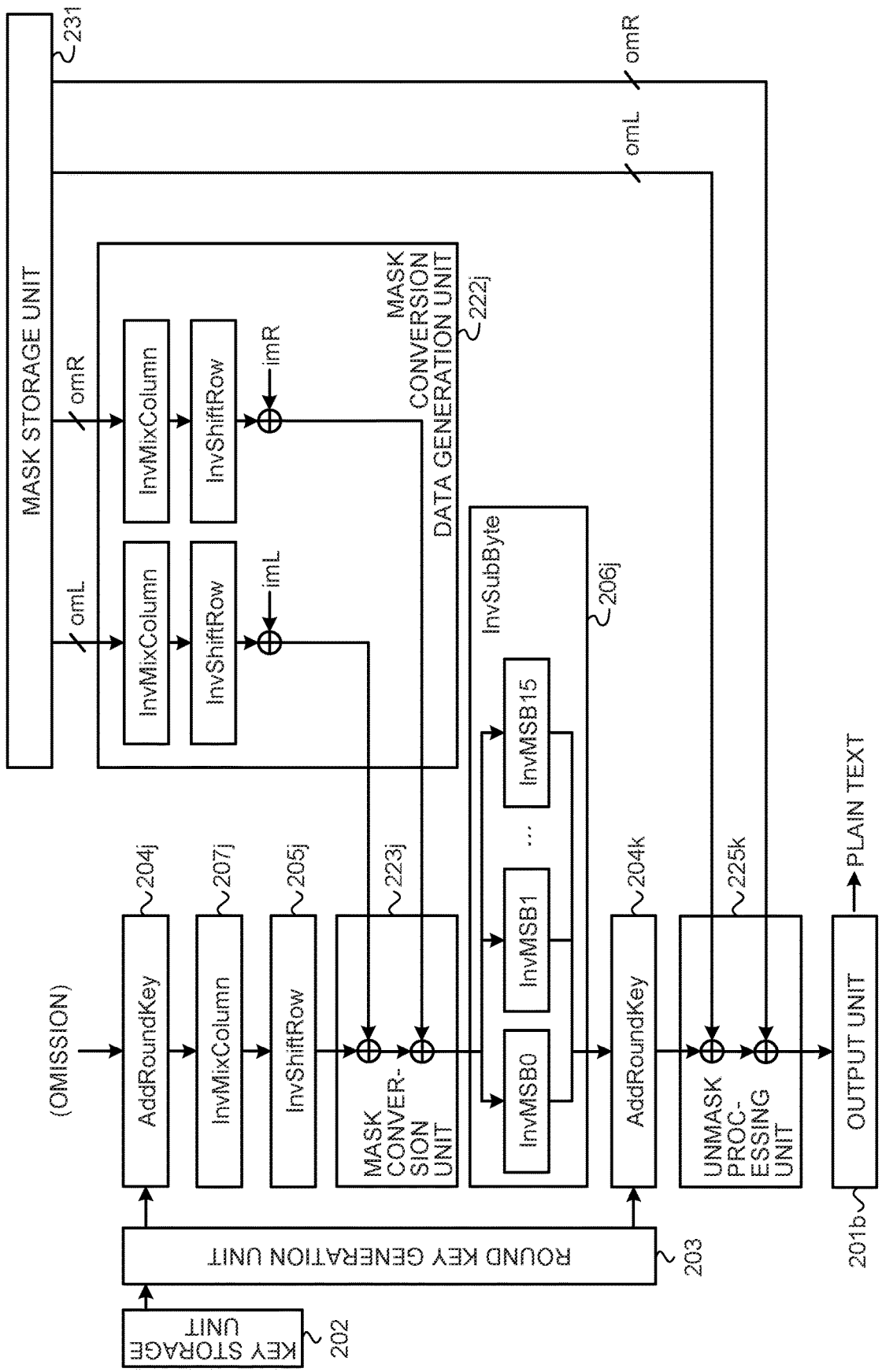

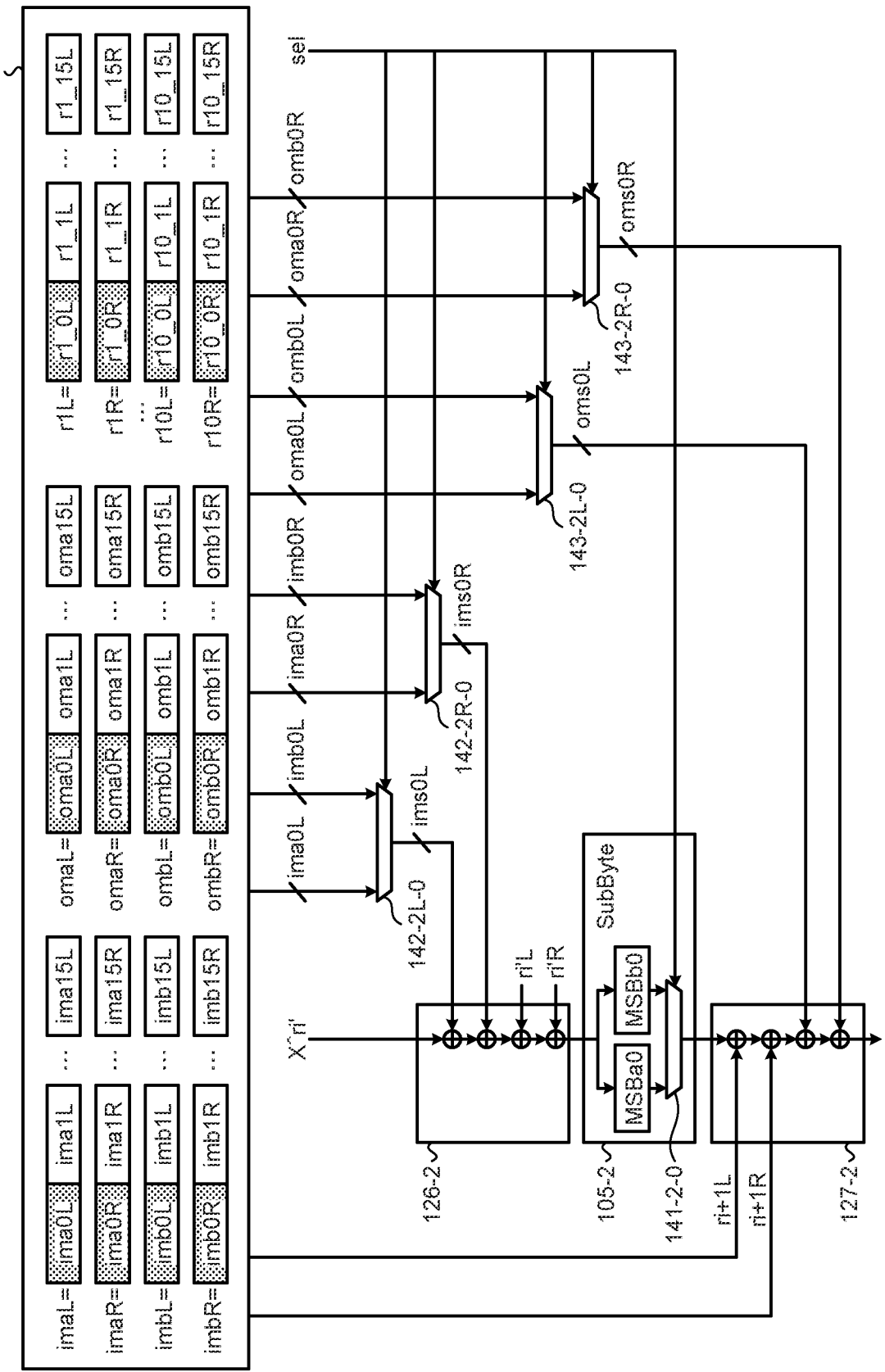

ENCRYPTION PROCESSING DEVICE, ENCRYPTION PROCESSING METHOD, AND COMPUTER PROGRAM PRODUCT

CROSS-REFERENCE TO RELATED APPLICATIONS

This application is based upon and claims the benefit of priority from Japanese Patent Application No. 2020-143482, filed on Aug. 27, 2020; the entire contents of which are incorporated herein by reference.

FIELD

Embodiments described herein relate generally to an encryption processing device, an encryption processing method, and a computer program product.

BACKGROUND

There have been developed various kinds of side channel attacks for analyzing a cryptographic key using physical information such as a processing time, power consumption, and an electromagnetic wave at the time when a cryptographic module operates. As an analysis method using power consumption information, there are known Simple Power Analysis (SPA), Differential Power Analysis (DPA), and Correlation Power Analysis (CPA). These are attack methods for extracting internal information by statistically analyzing power consumption during encryption processing. Deep Learning-based Power Analysis (DLPA) and Differential Deep Learning Analysis (DDLA) are attack methods for extracting internal information by using power consumption during encryption processing as data for learning for deep learning.

BRIEF DESCRIPTION OF THE DRAWINGS

FIG. 6A is a block diagram of a decoding device according to the first embodiment;
FIG. 6B is a block diagram of the decoding device according to the first embodiment;
FIG. 9 is a block diagram of an encoding device according to a second embodiment.

DETAILED DESCRIPTION

Figure 1:
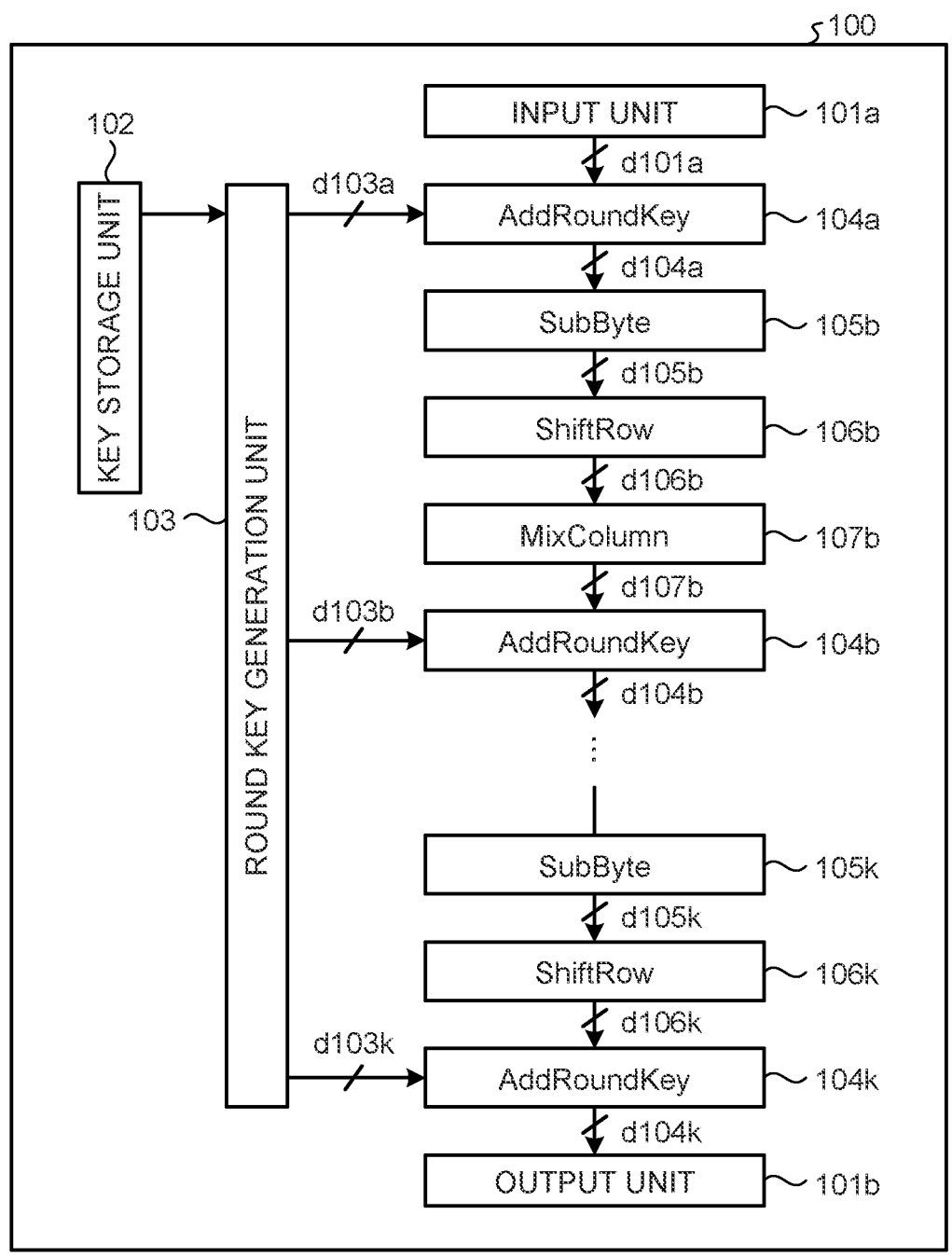
FIG. 1 is a block diagram of an encoding device.

According to an embodiment, an encryption processing device includes a memory and one or more processors. The memory is configured to store a plurality of divided masks to be applied to an input sentence on which mask processing is performed in units of processing of a predetermined size corresponding to a size of data obtained by dividing target data of encryption processing into a plurality of pieces, the divided masks each having a same size as that of data obtained by further dividing the data of the unit of processing. The one or more processors are configured to: read out the plurality of divided masks from the memory at different respective timings, and generate a plurality of first masks by using the read-out plurality of divided masks at different respective timings; and execute arithmetic processing on intermediate data of the encryption processing by using the plurality of first masks at different respective timings.

The following describes embodiments of an encryption processing device according to the present disclosure in detail with reference to the accompanying drawings.

As a countermeasure against DPA and CPA, a mask method is known. The mask method is performed to eliminate a correlation between power consumption and data under encryption processing by performing processing such as addition and multiplication on a random number or a fixed value, which is called mask, on the data under encryption processing to continue the encryption processing. The encryption processing includes encoding processing of encoding plain text to output cipher text, and decoding processing of decoding the cipher text to output the plain text. The plain text and the cipher text are examples of an input sentence that is input to the encryption processing device.

By using a second-order DPA and a second-order CPA, and a high-order DPA and a high-order CPA as expansions thereof, a cryptographic key can be analyzed from an encryption circuit subjected to the mask method. The second-order DPA is an attack method for determining presence/absence of a correlation between power consumption and data under encryption processing by using electric power at two points on a power consumption waveform while considering influence of the mask. As the two points on the power consumption waveform, for example, there are a case of using power consumption at a point at which data with a mask with respect to intermediate data of encryption processing is processed and a point at which the mask to be added to the data with a mask is processed, and a case of using power consumption at points at which two pieces of data to which the same mask is added are processed. An n-th order attack invalidates an (n−1)-th order countermeasure.

DLPA invalidates a high-order mask countermeasure. In n-th order DPA and n-th order CPA, an attack is performed by selecting electric power at n points, but in the DLPA, a plurality of points (equal to or larger than n) of electric power are input to an input node of a neural network. A power value at one point corresponds to one input node. Through learning of the neural network, an input node having large weight to be used for an attack is determined. As hyperparameters for the neural network, the number of layers, the number of nodes in a layer, an activation function, an optimization function, and the like are required to be given. As the number of input nodes is increased, it becomes difficult to search for a hyperparameter that enables derivation of a key.

Thus, in the following embodiments, to increase the number of input nodes, a configuration is made so that data as a processing unit (unit of processing) for applying a mask appears in a time-distributed manner. For example, the encryption processing device according to each of the embodiments is configured such that a plurality of divided masks each having the same size as that of data obtained by further dividing data of a processing unit are used for an arithmetic operation at timings different from each other. When the mask is divided so that electric power at (n+1) points or more is required, the mask may become a countermeasure against the n-th order DPA and the n-th order CPA.

Description of AES

The following describes an example in which the embodiment is applied to an encryption processing device (an encoding device, a decoding device) using an Advanced Encryption Standard (AES) scheme using a key length of 128 bits. The key length is not limited to 128 bits, and the embodiment can be similarly applied to key lengths of 196 bits and 256 bits. The embodiment can also be applied to a device for processing an encryption algorithm using other non-linear transformation such as a Data Encryption Standard (DES) and Hierocrypt.

In the AES using the key length of 128 bits, encryption processing is performed in units of data having a fixed length of 128 bits (also referred to as a block in some cases). For example, round processing using a round function is repeatedly performed on the block of 128 bits a prescribed round number of times. Round functions of the AES include SubByte, ShiftRow, MixColumn, and AddRoundKey. For example, in the AES, ten rounds from the first round to the tenth round are executed. The tenth round is the final round. The round functions in the tenth round include SubByte, ShiftRow, and AddRoundKey.

In a case of using the mask for the AES, the mask is applied in a processing unit of a predetermined size corresponding to a size of data obtained by dividing data having a fixed length (for example, 128 bits). The size of the processing unit can be, for example, (8×L) bits (L is an integral number equal to or larger than 1), but is not limited thereto. The following describes an example of a case in which the size of the processing unit is 8 bits.

The following describes a configuration example of the encoding device and the decoding device using the AES scheme. FIG. 1 is a block diagram illustrating an example of a configuration of an encoding device 100. As illustrated in FIG. 1, the encoding device 100 includes an input unit 101a, an output unit 101b, a key storage unit 102, a round key generation unit 103, AddRoundKeys 104a to 104k, SubBytes 105b to 105k, ShiftRows 106b to 106k, and MixColumns 107b to 107j.

The input unit 101a receives an input of plain text from the outside. The output unit 101b outputs cipher text as a processing result to the outside. The encoding device 100 may include an input/output unit having both functions of the input unit 101a and the output unit 101b.

The key storage unit 102 stores a secret key of 128 bits. The key storage unit 102 can be constituted of any of storage media that are generally used such as a hard disk drive (HDD), an optical disc, a memory card, and a random access memory (RAM).

The round key generation unit 103 calculates, from the secret key stored in the key storage unit 102, eleven round keys d103a to d103k of 128 bits to be supplied to the AddRoundKeys 104a to 104k. The round keys d103a to d103k may be calculated in advance before the AddRoundKey 104a is executed, or may be calculated in parallel with the AddRoundKeys 104a to 104k.

Data d101a input to the AddRoundKey 104a is the same as the input plain text. The AddRoundKeys 104a to 104k perform AddRoundKey conversion processing, which is specified by AES encryption, on pieces of data d101a, d107b to d107j, and d106k, and outputs pieces of data d104a to d104k. The pieces of data d104a to d104j are input to the SubBytes 105b to 105j. The data d104k is the same as the cipher text.

The SubBytes 105b to 105k perform non-linear transformation on the pieces of data d104a to d104j per 8 bits, and outputs pieces of data d105b to d105k. The pieces of data d105b to d105k are input to the ShiftRows 106b to 106k.

The ShiftRows 106b to 106k rearrange the pieces of data d105b to d105k in processing units of 8 bits, and outputs pieces of data d106b to d106k. The pieces of data d106b to d106j are input to MixColumns 107b to 107j. The data d106k is input to the AddRoundKey 104k.

The MixColumns 107b to 107j perform linear transformation on pieces of data d107b to d107j per 32 bits, and outputs the pieces of data d107b to d107j. The pieces of data d107b to d107j are input to the AddRoundKeys 104b to 104j.

Figure 2:
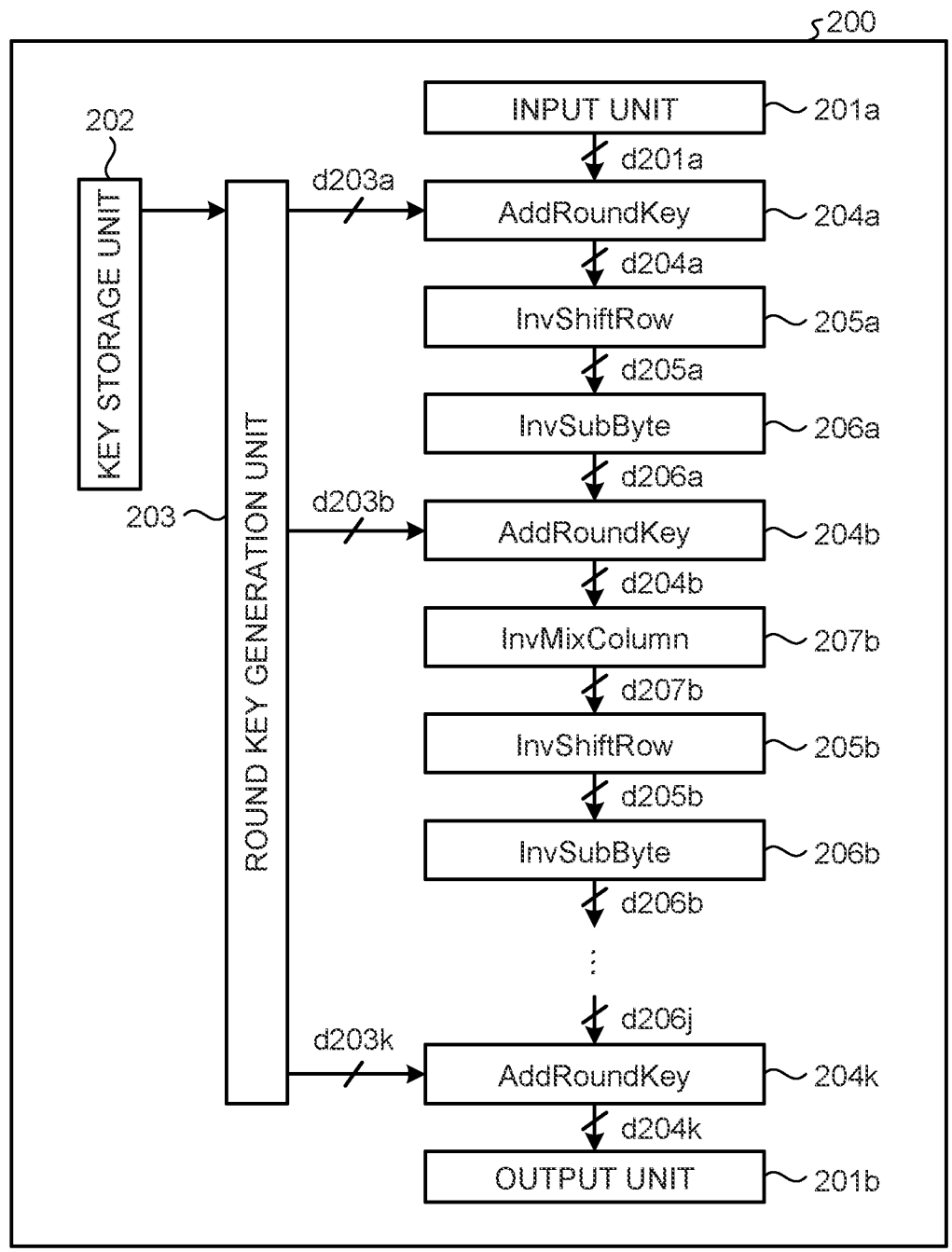
FIG. 2 is a block diagram of a decoding device.

FIG. 2 is a block diagram illustrating an example of a configuration of a decoding device 200. As illustrated in FIG. 2, the decoding device 200 includes an input unit 201a, an output unit 201b, a key storage unit 202, a round key generation unit 203, AddRoundKeys 204a to 204k, InvShiftRows 205a to 205j, InvSubBytes 206a to 206j, and InvMixColumns 207b to 207j.

The input unit 201a receives an input of cipher text from the outside. The output unit 201b outputs plain text as a processing result to the outside. The decoding device 200 may include an input/output unit having both functions of the input unit 201a and the output unit 201b.

The key storage unit 202 stores a secret key of 128 bits. The key storage unit 202 can be constituted of any of storage media that are generally used such as an HDD, an optical disc, a memory card, and a RAM.

The round key generation unit 203 calculates, from the secret key stored in the key storage unit 202, eleven round keys d203a to d203k of 128 bits to be supplied to the AddRoundKeys 204*a* to 204*k*. The round keys d203*a* to d203*k* may be calculated in advance before the AddRoundKey 204*a* is executed, or may be calculated in parallel with the AddRoundKeys 204*a* to 204*k*.

Data d201*a* input to the AddRoundKey 204*a* is the same as the input cipher text.

The AddRoundKeys 204*a* to 204*k* perform AddRoundKey conversion processing, which is specified by the AES encryption, on pieces of data d201*a* and d206*a* to d206*j*, and outputs pieces of data d204*a* to d204*k*. The data d204*a* is input to the InvShiftRow 205*a*. The pieces of data d204*b* to d204*j* are input to the InvMixColumns 207*b* to 207*j*. The data d204*k* is the same as the output plain text.

The InvShiftRows 205*a* to 205*j* rearrange the pieces of data d204*a* and d207*b* to d207*j* in processing units of 8 bits, and output pieces of data d205*a* to d205*j*. The pieces of data d205*a* to d205*j* are input to the InvSubBytes 206*a* to 206*j*.

The InvSubBytes 206*a* to 206*j* perform non-linear transformation on the pieces of data d205*a* to d205*j* per 8 bits, and output pieces of data d206*a* to d206*j*. The pieces of data d206*a* to d206*j* are input to the AddRoundKeys 204*b* to 204*j*.

The InvMixColumns 207*b* to 207*j* perform linear transformation on the pieces of data d204*b* to d204*j* per 32 bits, and outputs pieces of data d207*b* to d207*j*. The pieces of data d207*b* to d207*j* are input to the InvShiftRows 205*b* to 205*j*.

The processing units that perform pieces of processing in the respective rounds are separately illustrated in FIG. 1 and FIG. 2, but the processing units denoted by the same number have the same function and configuration. The configuration may be made such that, by providing commonality of the processing units denoted by the same number and different alphabets, one processing unit having commonality performs the pieces of processing in the respective rounds. For example, the AddRoundKeys 204*a* to 204*k* may be configured as one AddRoundKey 204.

In the following embodiments, a function of further dividing the mask to be applied is added to the configurations in FIG. 1 and FIG. 2. The following describes functions to be added in the respective embodiments in detail.

Term Definition

First, terms to be used in the respective embodiments are defined.

The intermediate data of the encryption processing is data that is calculated during processing specified by an encryption algorithm. In a case of encoding processing of AES, data that is input/output to/from the AddRoundKey, the SubByte, the ShiftRow, and the MixColumn, and data that is handled inside correspond to the intermediate data.

The mask is data that is processed by an arithmetic operation such as an exclusive OR on the intermediate data of the encryption processing to eliminate a correlation between the intermediate data of the encryption processing and power consumption. The mask applied to input data that is input to the SubByte is assumed to be an input mask, and the mask applied to output data that is output from the SubByte is assumed to be an output mask. The embodiments describe an example of the mask processed by an exclusive OR.

The encryption processing is performed in units of 16 bytes (128 bits). Each of the intermediate data of a SubByte input, the intermediate data of a SubByte output, the input mask, and the output mask is 16 bytes. In the embodiments, it is assumed that the input mask and the output mask are different for each byte, and are the same in each round. The input mask and the output mask may be the same for each byte. A value obtained by replacing at least part of bytes of the same mask (16 bytes) in each round may be used as the input mask and the output mask. Different input masks may be used in the respective rounds. Similarly, different output masks may be used in the respective rounds.

In the embodiments, the mask of 8 bits to be applied to the intermediate data of 1 byte, that is, 8 bits, is divided into two parts to be handled in units of 4 bits. The two masks that are divided correspond to the divided masks. A division method is not limited thereto, and the mask may be divided into four masks in units of 2 bits, or may be divided into eight masks in units of 1 bit, for example.

im0L means 4 bits on the left of the input mask of the 0th byte. im0R means 4 bits on the right of the input mask of the 0th byte. om0L means 4 bits on the left of the output mask of the 0th byte. om0R means 4 bits on the right of the output mask of the 0th byte. In the embodiments, the left side of certain data of 1 byte is treated as a higher-order bit, and the right side thereof is treated as a lower-order bit. The embodiments are not limited thereto, and the left side and the right side may be reversed.

Each mask includes 16 bytes from the 0th byte to the 15th byte. imL is an expression for collectively representing 4 bits on the left of the 0th byte to the 15th byte of the input mask. imR is an expression for collectively representing 4 bits on the right of the 0th byte to the 15th byte of the input mask. omL is an expression for collectively representing 4 bits on the left of the 0th byte to the 15th byte of the output mask. omR is an expression for collectively representing 4 bits on the right of the 0th byte to the 15th byte of the output mask.

First Embodiment

The following describes a configuration example of an encoding device and a decoding device according to a first embodiment. Functions overlapping with those in FIG. 1 and FIG. 2 are denoted by the same reference numerals, and redundant description thereof will not be repeated.

Figure 3A:
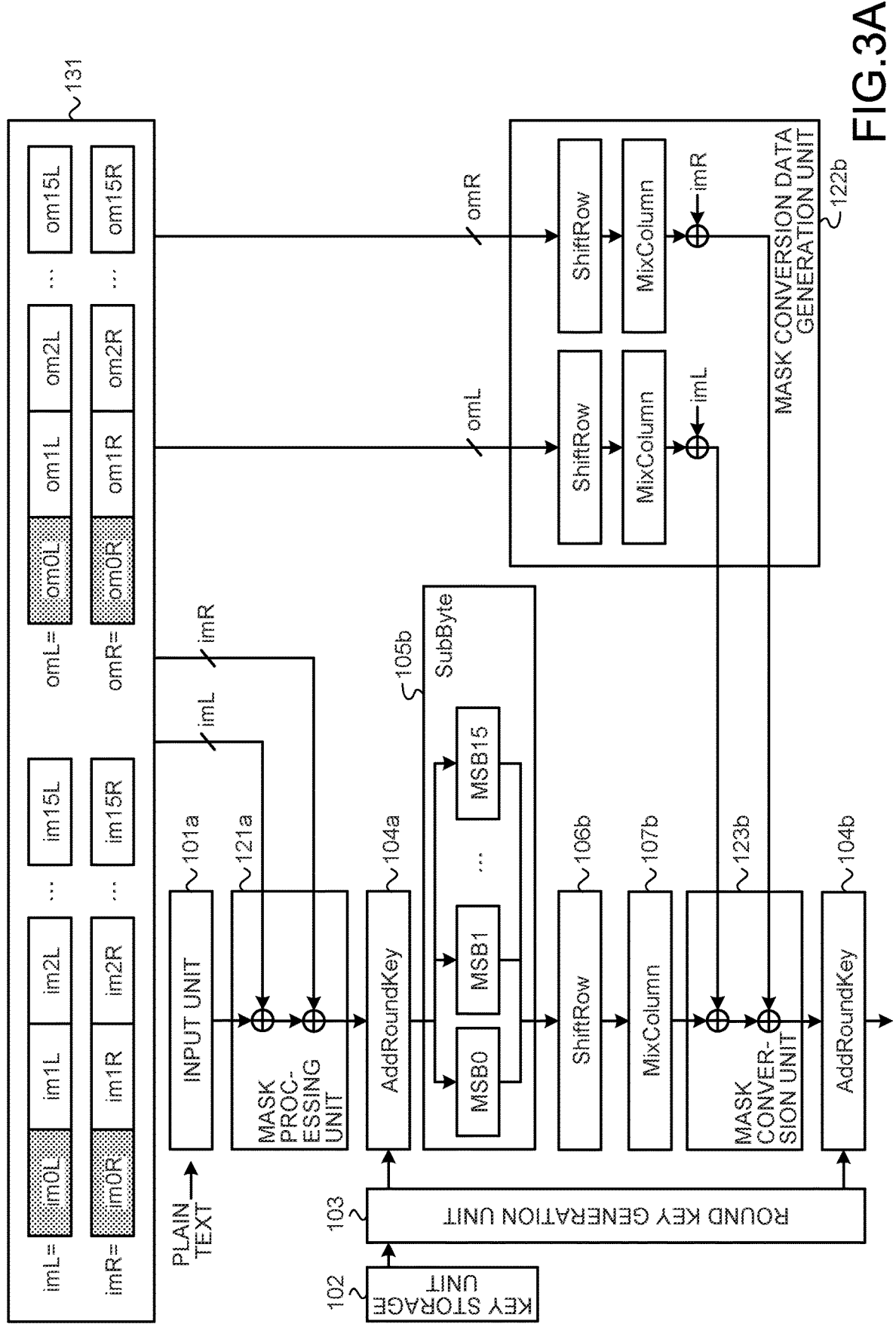
FIG. 3A is a block diagram of an encoding device according to a first embodiment.
Figure 3B:
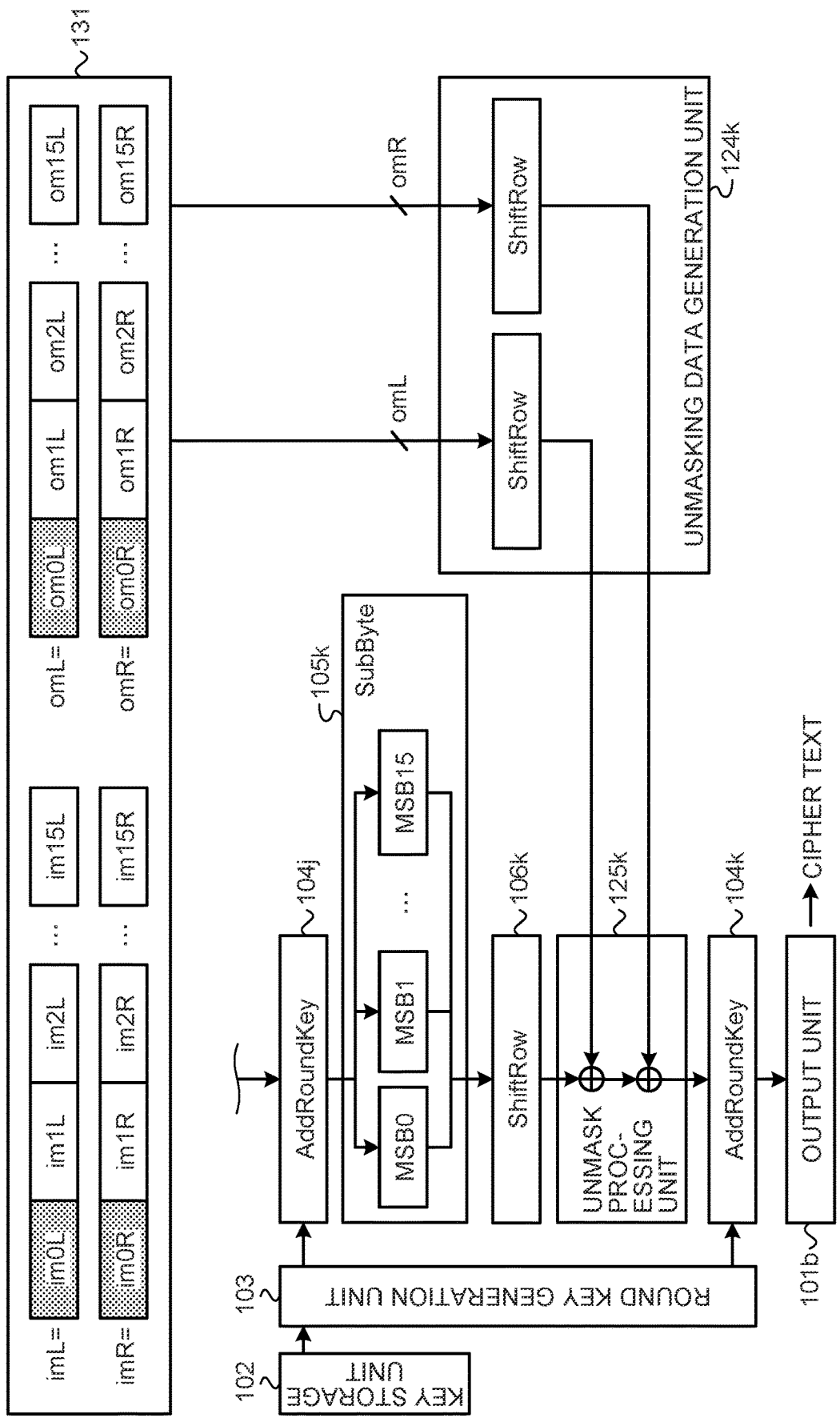
FIG. 3B is a block diagram of the encoding device according to the first embodiment.

FIG. 3A and FIG. 3B are block diagrams illustrating an example of a configuration of the encoding device according to the present embodiment. The encoding device according to the present embodiment includes the input unit 101*a*, the output unit 101*b*, the key storage unit 102, the round key generation unit 103, the AddRoundKeys 104*a* to 104*k*, the SubBytes 105*b* to 105*k*, the ShiftRows 106*b* to 106*k*, the MixColumns 107*b* to 107*j*, a mask storage unit 131, a mask processing unit 121*a*, an unmask processing unit 125*k* (an example of an arithmetic unit), mask conversion units 123*b* to 123*j* (an example of the arithmetic unit), mask conversion data generation units 122*b* to 122*j* (an example of a generation unit), and an unmasking data generation unit 124*k* (an example of the generation unit).

The mask storage unit 131 divides 1 byte, that is, 8 bits of the input mask into two parts, that is, 4 bits on the left and 4 bits on the right to be stored therein as divided masks. Similarly, the mask storage unit 131 divides the output mask into two parts, that is, 4 bits on the left and 4 bits on the right to be stored therein as divided masks. The input mask and the output mask of each byte may be the same, or may have values different from each other.

The mask processing unit 121*a* calculates an exclusive OR of 4 bits on the left of each byte of the input mask and 4 bits on the left of each byte of the plain text received from the input unit 101*a*. The mask processing unit 121*a* also calculates an exclusive OR of 4 bits on the right of each byte of the input mask and 4 bits on the right of each byte of the plain text received from the input unit 101*a* at a timing different from that for the exclusive OR of the 4 bits on the left. Order of the calculation for the left side and the calculation for the right side may be replaced with each other, or may be changed at least for each byte or each round.

The SubByte 105b receives an input of intermediate data with a mask of 16 bytes as an output of the AddRoundKey 104a. The SubByte 105b calculates the 0th byte of an output of an Sbox with a mask using a look-up table of the 0th byte (MSB0) of the Sbox with a mask for the 0th byte of the intermediate data, for example. The SubByte 105b similarly calculates the output of the Sbox with a mask up to the 15th byte.

Figure 4:
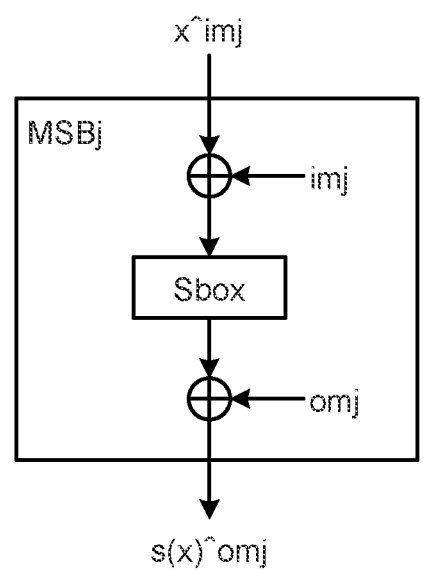
FIG. 4 is a block diagram of an Sbox with a mask.

FIG. 4 is a block diagram illustrating an example of a configuration of the Sbox with a mask used in the SubBytes 105b to 105k. The Sbox with a mask functions as a look-up table that inputs 1 byte and outputs 1 byte. An input value and an output value both take values from 0 to 255. A symbol "^" in FIG. 4 represents an exclusive OR. j takes values from 0 to 15. imj represents the input mask (8 bits) of the j-th byte ($0 \leq j \leq 15$). omj represents the output mask (8 bits) of the j-th byte. x^imj represents an input of the Sbox with a mask, and s(x)^omj represents an output of the Sbox with a mask.

The look-up table of MSB0 as the 0th byte of the Sbox with a mask inputs an exclusive OR of an input value and the input mask im0 to the Sbox, and causes an exclusive OR of an output of the Sbox and the output mask=0 to be an output value. The same applies to the other 15 bytes (MSB1 to MSB15).

In the embodiment, input/output masks of the sixteen Sboxes with a mask are different from each other. The Sbox with a mask of each byte is the same every time even in a case of performing the encryption processing multiple times, and the same in the respective rounds. The configuration of the Sbox with a mask is not limited thereto. For example, prepared sixteen Sboxes with a mask may be shuffled to be used for each piece of the encryption processing to be performed, or for each round. The Sboxes with a mask the number of which is smaller than sixteen may be prepared, and used in a duplicated manner between bytes. One Sbox with a mask may be prepared, and the same Sbox with a mask may be used for all of the bytes. The Sboxes with a mask the number of which is larger than sixteen may be prepared, and different Sboxes with a mask may be used for the respective rounds.

The process returns to FIGS. 3A and 3B, the ShiftRow 106b performs ShiftRow processing on an output of the Sbox with a mask.

The MixColumn 107b performs MixColumn processing on an output of the ShiftRow 106b.

The mask conversion data generation unit 122b reads out 4 bits on the left om0L to om15L of sixteen output masks from the mask storage unit 131, and treats one mask as 8 bits assuming 4 bits as higher-order 4 bits, and lower-order 4 bits as 0. The mask conversion data generation unit 122b performs ShiftRow processing on the sixteen output masks. The mask conversion data generation unit 122b performs MixColumn processing on a ShiftRow output value.

The mask conversion data generation unit 122b also calculates an exclusive OR of the 0th byte of a MixColumn output value and a value of 1 byte obtained by assuming lower-order 4 bits as 0 and 4 bits on the left im0L of the input mask of the Sbox with a mask in the next round as higher-order 4 bits. In a case of using the same mask in the respective rounds, the input mask of the Sbox with a mask in the next round is the same as the input mask in a present round. In a case of using different masks in the respective rounds, the input mask of the Sbox with a mask in the next round is different from the input mask in the present round. The same applies to the following. The mask conversion data generation unit 122b similarly performs calculation up to the 15th byte, and outputs sixteen pieces of mask conversion data MDL (an example of a first mask).

Similarly, the mask conversion data generation unit 122b reads out 4 bits on the right om0R to om15R of the sixteen output masks from the mask storage unit 131, and treats one mask as 8 bits assuming the 4 bits as lower-order 4 bits, and higher-order 4 bits as 0. The mask conversion data generation unit 122b performs ShiftRow processing on the sixteen output masks. The mask conversion data generation unit 122b performs MixColumn processing on the ShiftRow output value.

The mask conversion data generation unit 122b also calculates an exclusive OR of the 0th byte of the MixColumn output value and 4 bits on the right im0R of the input mask of the Sbox with a mask in the next round as lower-order 4 bits. The mask conversion data generation unit 122b similarly performs calculation up to the 15th byte, and outputs sixteen pieces of mask conversion data MDR (an example of the first mask).

The mask conversion data generation unit 122b calculates the mask conversion data MDL and the mask conversion data MDR at different timings.

The mask conversion data generation unit 122b may generate the MixColumn output value of the mask conversion data MDL using the following method. That is, the mask conversion data generation unit 122b reads out 4 bits on the left om0L to om15L of the sixteen output masks from the mask storage unit 131, and treats one mask as 8 bits assuming 4 bits as lower-order 4 bits, and higher-order 4 bits as 0. The mask conversion data generation unit 122b performs ShiftRow processing on the sixteen output masks. The mask conversion data generation unit 122b performs MixColumn processing on the ShiftRow output value, and multiply a processing result thereof by 16. If a calculation result is the same, data of bits padded with 0 is not required in implementation.

The mask conversion unit 123b performs mask conversion processing (an example of arithmetic processing) using the mask conversion data. For example, the mask conversion unit 123b receives inputs of an output value of the MixColumn 107b, the mask conversion data MDL, and the mask conversion data MDR, each of which is 16 bytes. The mask conversion unit 123b calculates an exclusive OR of the output value of the MixColumn 107b and the mask conversion data MDL, and calculates and outputs an exclusive OR of a result thereof and the mask conversion data MDR. Calculation order of the mask conversion data MDL and the mask conversion data MDR may be replaced with each other. AddRoundKey processing may be performed before the processing performed by the mask conversion unit 123b.

The mask conversion data MDL and the mask conversion data MDR are input at different timings, and calculation of the exclusive OR is performed. After the calculation for one of them is completed, the other piece of the mask conversion data is input, and calculation of the exclusive OR is performed.

The same processing as that described above is performed excluding the final round of AES. It can be interpreted that the mask conversion data generation units 122b to 122j generate a plurality of pieces of mask conversion data for converting a plurality of masks used in mask processing on the intermediate data of round processing in the i-th round ($1 \leq i \leq$ prescribed round number, the prescribed round number is 10, for example). Additionally, it can be interpreted that the mask conversion units 123b to 123j perform mask conversion processing on the intermediate data of the round processing in the i-th round using the respective pieces of the generated mask conversion data at different timings.

The MixColumn processing is not performed in the final round of AES. That is, only pieces of processing of the SubByte 105k, the ShiftRow 106k, and the AddRoundKey 104k are performed.

The unmasking data generation unit 124k reads out 4 bits on the left om0L to om15L of the sixteen output masks from the mask storage unit 131, and treats one mask as 8 bits assuming 4 bits as higher-order 4 bits, and lower-order 4 bits as 0. The unmasking data generation unit 124k performs ShiftRow processing on the sixteen output masks. The unmasking data generation unit 124k outputs the ShiftRow output value as unmasking data UMDL (an example of the first mask).

Similarly, the unmasking data generation unit 124k reads out 4 bits on the right om0R to om15R of the sixteen output masks from the mask storage unit 131, and treats one mask as 8 bits assuming the 4 bits thereof as lower-order 4 bits, and higher-order 4 bits as 0. The unmasking data generation unit 124k performs ShiftRow processing on the sixteen output masks. The unmasking data generation unit 124k outputs the ShiftRow output value as unmasking data UMDR (an example of the first mask). The unmasking data generation unit 124k calculates the unmasking data UMDL and the unmasking data UMDR at different timings.

The unmask processing unit 125k performs unmask processing (an example of the arithmetic processing) using the unmasking data. For example, the unmask processing unit 125k receives inputs of the output value of the ShiftRow 106k, the unmasking data UMDL, and the unmasking data UMDR, each of which is 16 bytes. The unmask processing unit 125k calculates an exclusive OR of the output value of the ShiftRow 106k and the unmasking data UMDL, and calculates an exclusive OR of a result thereof and the unmasking data UMDR to be output. Calculation order of the unmasking data UMDL and the unmasking data UMDR may be replaced with each other. The order may be changed at least for each byte or each round. The AddRoundKey processing may be performed before the processing performed by the unmask processing unit 125k.

Each mask may have a value prepared in advance. The configuration may be made such that the encoding device includes the random number generation unit, and uses a random number generated by the random number generation unit as a mask.

Figure 5:
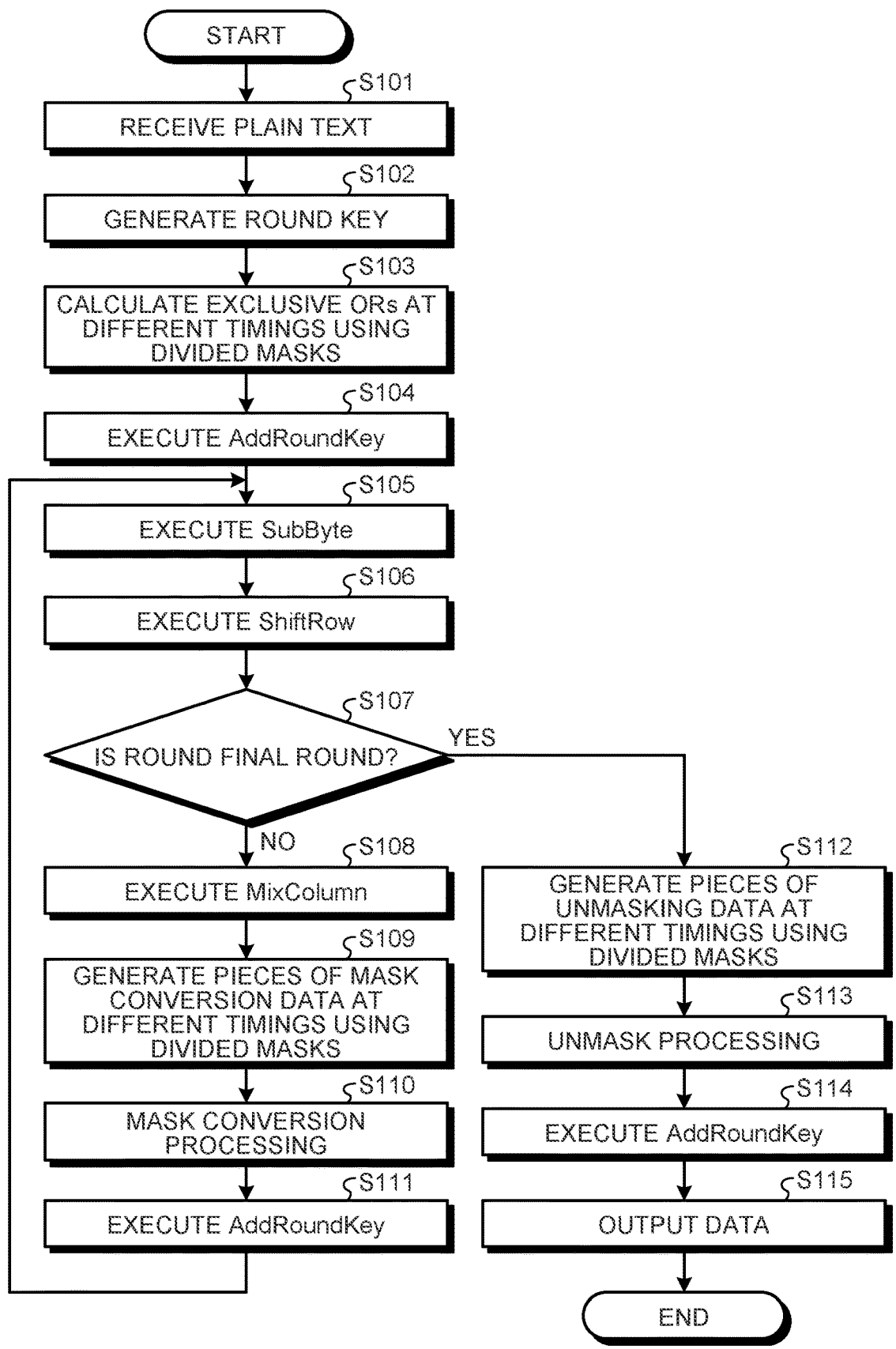
FIG. 5 is a flowchart of encoding processing in the first embodiment.

Next, the following describes encoding processing performed by the encoding device according to the first embodiment that is configured as described above. FIG. 5 is a flowchart illustrating an example of encoding processing in the first embodiment.

First, the input unit 101a receives plain text (Step S101). Next, the round key generation unit 103 calculates the eleven round keys d103a to d103k of 128 bits using the secret key stored in the key storage unit 102 (Step S102).

The mask processing unit 121a calculates respective exclusive ORs for the left and the right bits at different timings using the masks (divided masks) obtained by being divided into the 4 bits on the left and the 4 bits on the right (Step S103). For example, the mask processing unit 121a calculates an exclusive OR of 4 bits on the left imL of each byte of the input mask and 4 bits on the left of each byte of the plain text. The mask processing unit 121a also calculates an exclusive OR of 4 bits on the right imR of each byte of the input mask and 4 bits on the right of each byte of the plain text at a timing different from that for the exclusive OR of the 4 bits on the left.

The AddRoundKey 104a performs AddRoundKey conversion processing on the plain text on which the mask processing is performed by the mask processing unit 121a (Step S104). The SubByte 105b receives an input of the intermediate data with a mask of 16 bytes as an output of the AddRoundKey 104a, and outputs an output value of the Sbox with a mask (Step S105). The ShiftRow 106b performs ShiftRow processing on the output of the Sbox with a mask (Step S106).

The encoding device 100 determines whether the round is the final round (Step S107). If the round is not the final round (No at Step S107), processing is performed by the MixColumn 107b (Step S108).

The mask conversion data generation unit 122b generates the mask conversion data MDL and the mask conversion data MDR corresponding to the left and the right bits at different timings using the masks (divided masks) obtained by being divided into the 4 bits on the left and the 4 bits on the right (Step S109).

The mask conversion unit 123b performs pieces of mask conversion processing respectively using the mask conversion data MDL and the mask conversion data MDR at different timings (Step S110).

The processing order of Step S109 and Step S110 may be changed so that the processing is performed in the following order of (A1), (A2), (A3), and (A4). Furthermore, the configuration may be made to perform the processing in order of replacing the left with the right, that is, in order of (A3), (A4), (A1), and (A2).

(A1) Generate the mask conversion data MDL (A2) Perform mask conversion processing using the mask conversion data MDL (A3) Generate the mask conversion data MDR (A4) Perform mask conversion processing using the mask conversion data MDR The AddRoundKey 104a performs processing of the AddRoundKey on a result of the mask conversion processing (Step S111). Thereafter, the process returns to Step S105, and the same processing is repeated for the next round.

If it is determined that the round is the final round at Step S107 (Yes at Step S107), processing of the final round is performed as follows.

First, the unmasking data generation unit 124k generates the unmasking data UMDL and the unmasking data UMDR corresponding to the left and the right bits at different timings using the masks (divided masks) obtained by being divided into the 4 bits on the left and the 4 bits on the right (Step S112).

The unmask processing unit 125k performs pieces of unmask processing respectively using the unmasking data UMDL and the unmasking data UMDR at different timings (Step S113). The AddRoundKey 104k performs processing of the AddRoundKey on a result of the unmask processing (Step S114). The output unit 101b outputs data as a processing result of the AddRoundKey 104k (Step S115), and ends the encoding processing.

Next, the following describes the decoding device according to the first embodiment. FIG. 6A and FIG. 6B are block diagrams illustrating an example of a configuration of the decoding device according to the present embodiment. The decoding device includes the input unit 201a, the output unit 201b, the key storage unit 202, the round key generation unit 203, the AddRoundKeys 204a to 204k, the InvShiftRows 205a to 205j, the InvSubBytes 206a to 206j, the InvMixColumns 207*b* to 207*j*, a mask storage unit 231, a mask processing unit 221*a*, an unmask processing unit 225*k*, mask conversion units 223*b* to 223*j*, and mask conversion data generation units 222*b* to 222*j*.

The mask storage unit 231, the mask processing unit 221*a*, and the mask conversion units 223*b* to 223*j* may have the same configurations as those of the mask storage unit 131, the mask processing unit 121*a*, and the mask conversion units 123*b* to 123*j* of the encoding device.

The unmask processing unit 225*k* is different from the unmask processing unit 125*k* of the encoding device in that the 4 bits on the left omL and the 4 bits on the right omR of the sixteen output masks read out from the mask storage unit 231 are used in place of the pieces of unmasking data UMDL and UMDR.

The mask conversion data generation units 222*b* to 222*j* each include the InvMixColumn and the InvShiftRow in place of the ShiftRow and the MixColumn in the mask conversion data generation units 122*b* to 122*j*.

Figure 7:
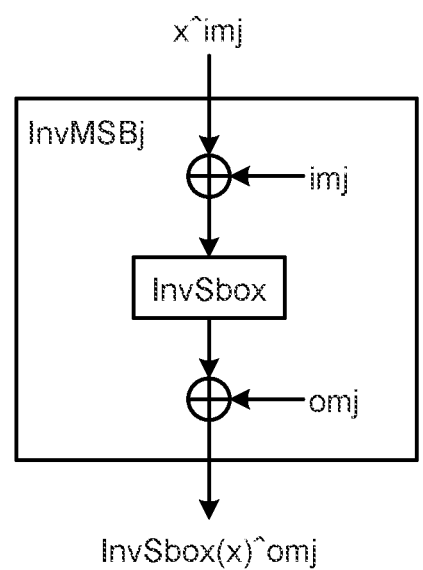
FIG. 7 is a block diagram of the Sbox with a mask.

FIG. 7 is a block diagram illustrating an example of a configuration of the Sbox with a mask (InvMSBi, i is 0 to 15) used in the InvSubBytes 206*a* to 206*j* of the decoding device. In the InvMSBi, an InvSbox is used in place of the Sbox in FIG. 4.

Figure 8:
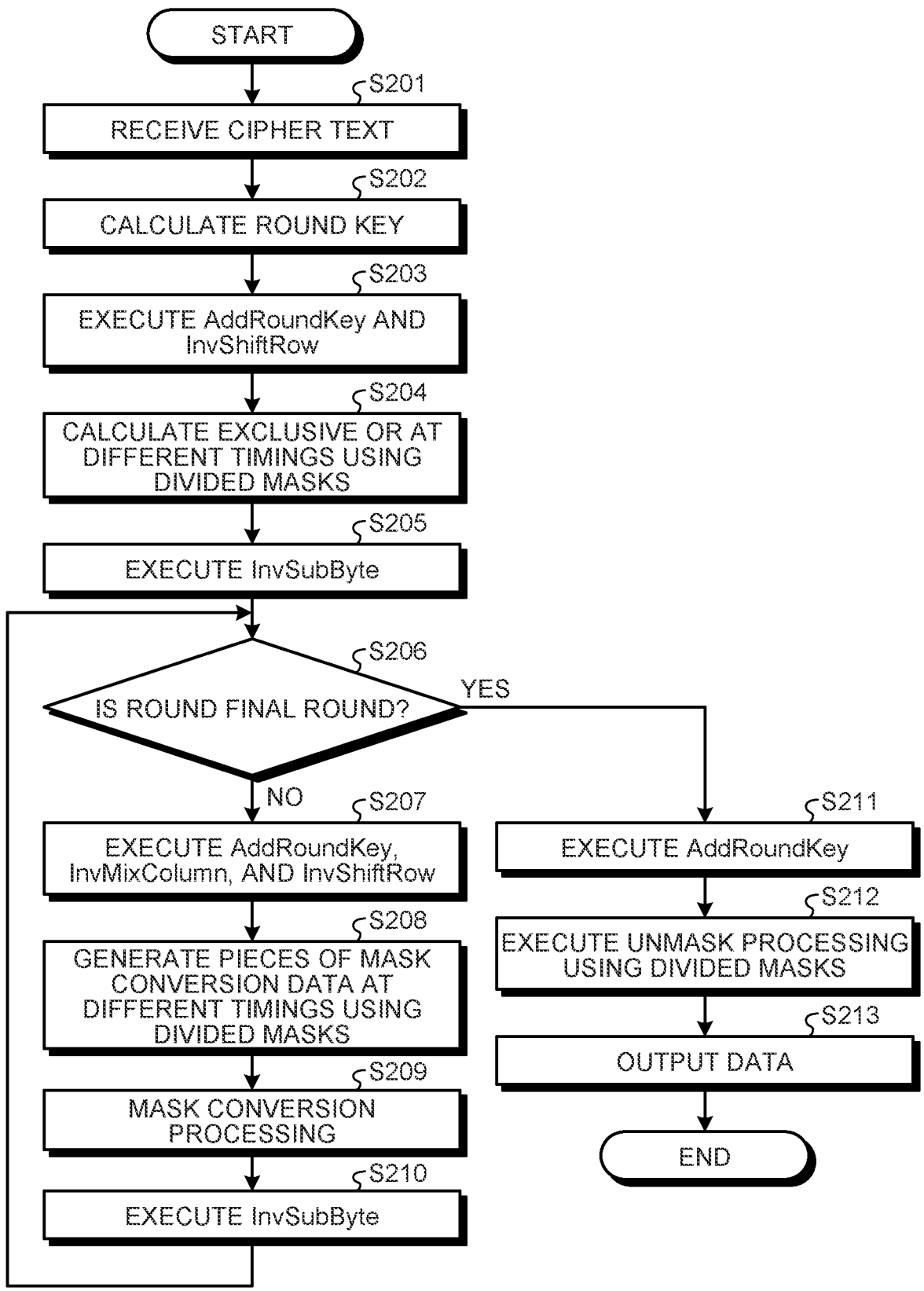
FIG. 8 is a flowchart of decoding processing in the first embodiment.

Next, the following describes decoding processing performed by the decoding device according to the first embodiment that is configured as described above. FIG. 8 is a flowchart illustrating an example of the decoding processing in the first embodiment.

First, the input unit 201*a* receives cipher text (Step S201). Next, the round key generation unit 203 calculates the eleven round keys d203*a* to d203*k* of 128 bits using the secret key stored in the key storage unit 202 (Step S202).

Processing by the AddRoundKey 204*a* and processing by the InvShiftRow 205*a* are performed on the cipher text (Step S203).

The mask processing unit 221*a* calculates respective exclusive ORs for the left and the right bits at different timings using the masks (divided masks) obtained by being divided into the 4 bits on the left and the 4 bits on the right (Step S204).

The InvSubByte 206*a* receives an input of the intermediate data with a mask of 16 bytes as an output of the mask processing unit 221*a*, and outputs an output value of the InvSbox with a mask (Step S205).

The decoding device 200 determines whether the round is the final round (Step S206). If the round is not the final round (No at Step S206), pieces of processing by the AddRoundKey 204*b*, the InvMixColumn 207*b*, and the InvShiftRow 205*b* are performed in order (Step S207).

The mask conversion data generation unit 222*b* generates the mask conversion data MDL and the mask conversion data MDR corresponding to the left and the right bits at different timings using the masks (divided masks) obtained by being divided into the 4 bits on the left and the 4 bits on the right (Step S208).

The mask conversion unit 223*b* performs pieces of mask conversion processing respectively using the mask conversion data MDL and the mask conversion data MDR at different timings (Step S209).

Similarly to the encoding processing (FIG. 5), the configuration may be made such that Step S208 and Step S209 are performed in the order of (A1), (A2), (A3), and (A4), or in the order of (A3), (A4), (A1), and (A2) as described above.

The InvSubByte 206*b* receives an input of the intermediate data with a mask of 16 bytes as an output of the mask conversion processing, and outputs an output value of the InvSbox with a mask (Step S210). Thereafter, the process returns to Step S206, the same processing is repeated for the next round.

If it is determined that the round is the final round at Step S206 (Yes at Step S206), processing of the final round is performed as follows.

First, processing is performed by the AddRoundKey 204*k* (Step S211). The unmask processing unit 225*k* performs pieces of unmask processing using the 4 bits on the left omL and the 4 bits on the right omR of the output mask at different timings (Step S212). The output unit 210*b* outputs data as a result of the unmask processing (Step S213), and ends the decoding processing.

Second Embodiment

The second embodiment takes a countermeasure against a mask different from that in the first embodiment. Also in the present embodiment, the divided masks obtained by dividing the mask are used for an arithmetic operation at different timings. Terms used in the present embodiment are the same as those in the first embodiment unless specifically noted.

In the present embodiment, there are two types of masks to be applied to the input data that is input to the SubByte. One of the two types of input masks is assumed to be an input mask A (ima), and the other one thereof is assumed to be an input mask B (imb). The input data is 16 bytes, so that each of the input masks is also 16 bytes. Respective bytes of the input mask A are represented as ima0 to ima15. Respective bytes of the input mask B are represented as imb0 to imb15.

Similarly, there are two types of masks to be applied to the output data that is output from the SubByte. One of the two types of output masks is assumed to be an output mask A (oma), and the other one thereof is assumed to be an output mask B (omb). The output mask is also 16 bytes. Respective bytes of the output mask A are represented as oma0 to oma15. Respective bytes of the output mask B are represented as omb0 to omb15.

A value obtained by inverting the bits of the input mask ima0 is imb0. A value obtained by inverting the bits of the output mask oma0 is omb0. The same applies to the other fifteen bytes.

4 bits on the left of the input mask A (ima0) of the 0th byte are represented as ima0L, and 4 bits on the right thereof are represented as ima0R. 4 bits on the left of the input mask B (imb0) of the 0th byte are represented as imb0L, and 4 bits on the right thereof are represented as imb0R.

4 bits on the left of the output mask A (oma0) of the 0th byte are represented as oma0L, and 4 bits on the right thereof are represented as oma0R. 4 bits on the left of the output mask B (omb0) of the 0th byte are represented as omb0L, and 4 bits on the right thereof are represented as omb0R.

A selection unit (described later) selects any of the input mask ima0L and the input mask imb0L. The selected input mask is represented as ims0L. The selection unit selects any of the input mask ima0R and the input mask imb0R. The selected input mask is represented as ims0R. The selection unit selects any of the output mask oma0L and the output mask omb0L. The selected output mask is represented as oms0L. The selection unit selects any of the output mask oma0R and the output mask omb0R. The selected output mask is represented as oms0R. The same applies to the other 15 bytes.

In a case of collecting the bytes of each mask, they are represented as follows.

4 bits on the left of the 0th to the 15th bytes of the input mask A: imaL 4 bits on the right of the 0th to the 15th bytes of the input mask A: imaR 4 bits on the left of the 0th to the 15th bytes of the input mask B: imbL 4 bits on the right of the 0th to the 15th bytes of the input mask B: imbR 4 bits on the left of the 0th to the 15th bytes of the output mask A: omaL 4 bits on the right of the 0th to the 15th bytes of the output mask A: omaR 4 bits on the left of the 0th to the 15th bytes of the output mask B: ombL 4 bits on the right of the 0th to the 15th bytes of the output mask B: ombR 4 bits on the left of the 0th to the 15th bytes of the selected input mask: imsL 4 bits on the right of the 0th to the 15th bytes of the selected input mask: imsR 4 bits on the left of the 0th to the 15th bytes of the selected output mask: omsL 4 bits on the right of the 0th to the 15th bytes of the selected output mask: omsR In each round and for each byte, a different mask is applied to processing other than the processing of the Sbox in each round. This mask is assumed to be a random mask. The random mask applied to a SubByte output of the j-th byte in the i-th round is denoted as ri_j. This random mask needs to be removed before an input to the SubByte of the j-th byte in the (i+1)-th round. Data for removing a random mask ri_j is denoted as r'i_j. ri_0 to ri_15 are collectively denoted as ri.

4 bits on the left of the random mask ri_j is represented as ri_jL, and 4 bits on the right of the random mask ri_j is represented as ri_jR. Random masks ri_0L to ri_15L are collectively represented as riL. Random masks ri_0R to ri_15R are collectively represented as riR.

In the present embodiment, similarly to the first embodiment, the mask of 8 bits applied to the intermediate data of 1 byte, that is, 8 bits, is divided into two parts to be treated in units of 4 bits. A division method is not limited thereto, and the mask may be divided into four parts in units of 2 bits, or may be divided into eight parts in units of 1 bit, for example.

The following describes a configuration example of the encoding device and the decoding device according to the present embodiment. Functions overlapping with those in FIG. 1, FIG. 2, and the first embodiment are denoted by the same reference numerals, and redundant description thereof will not be repeated.

Figure 10A:
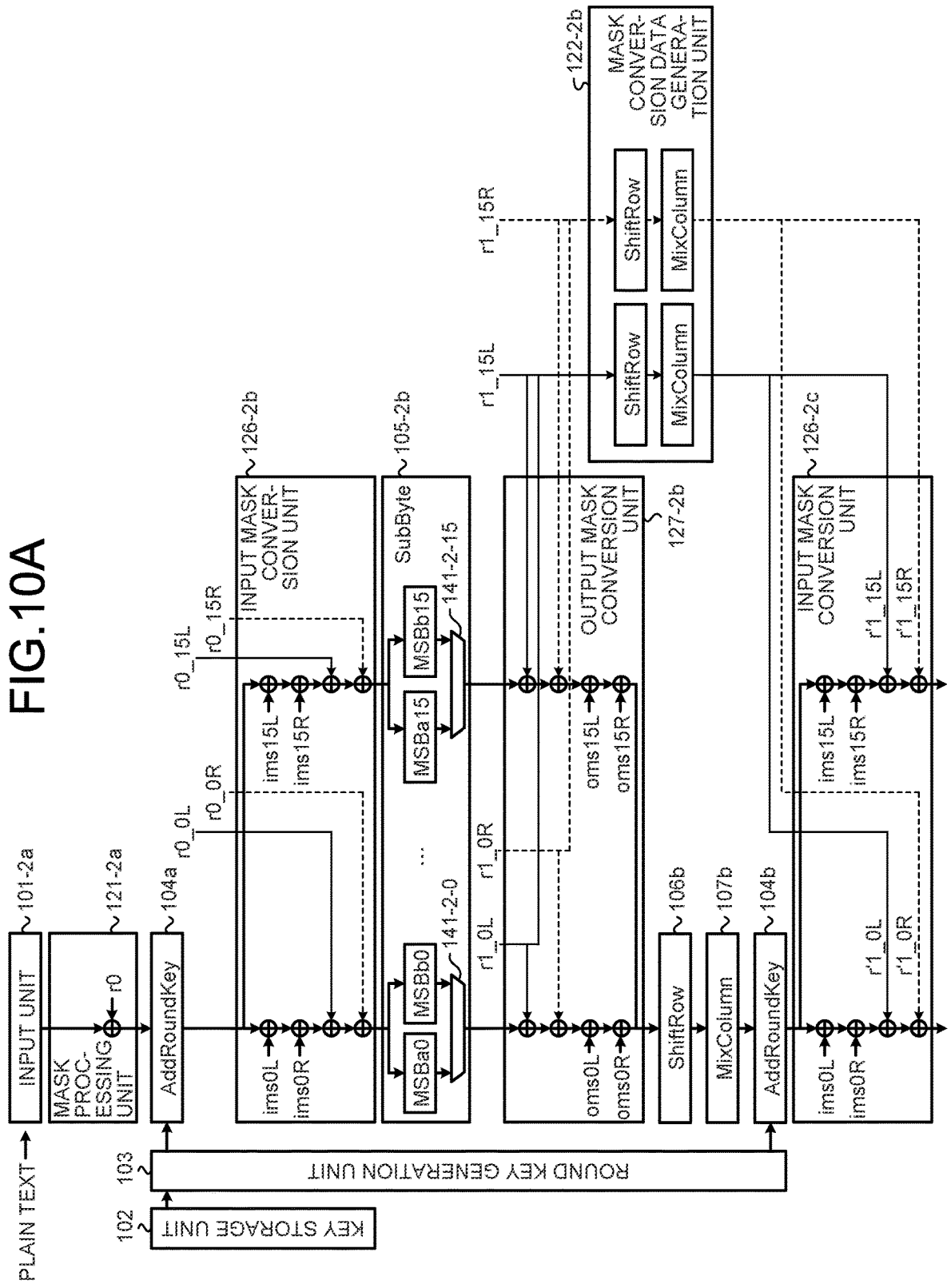
FIG. 10A is a block diagram of the encoding device according to the second embodiment.
Figure 10B:
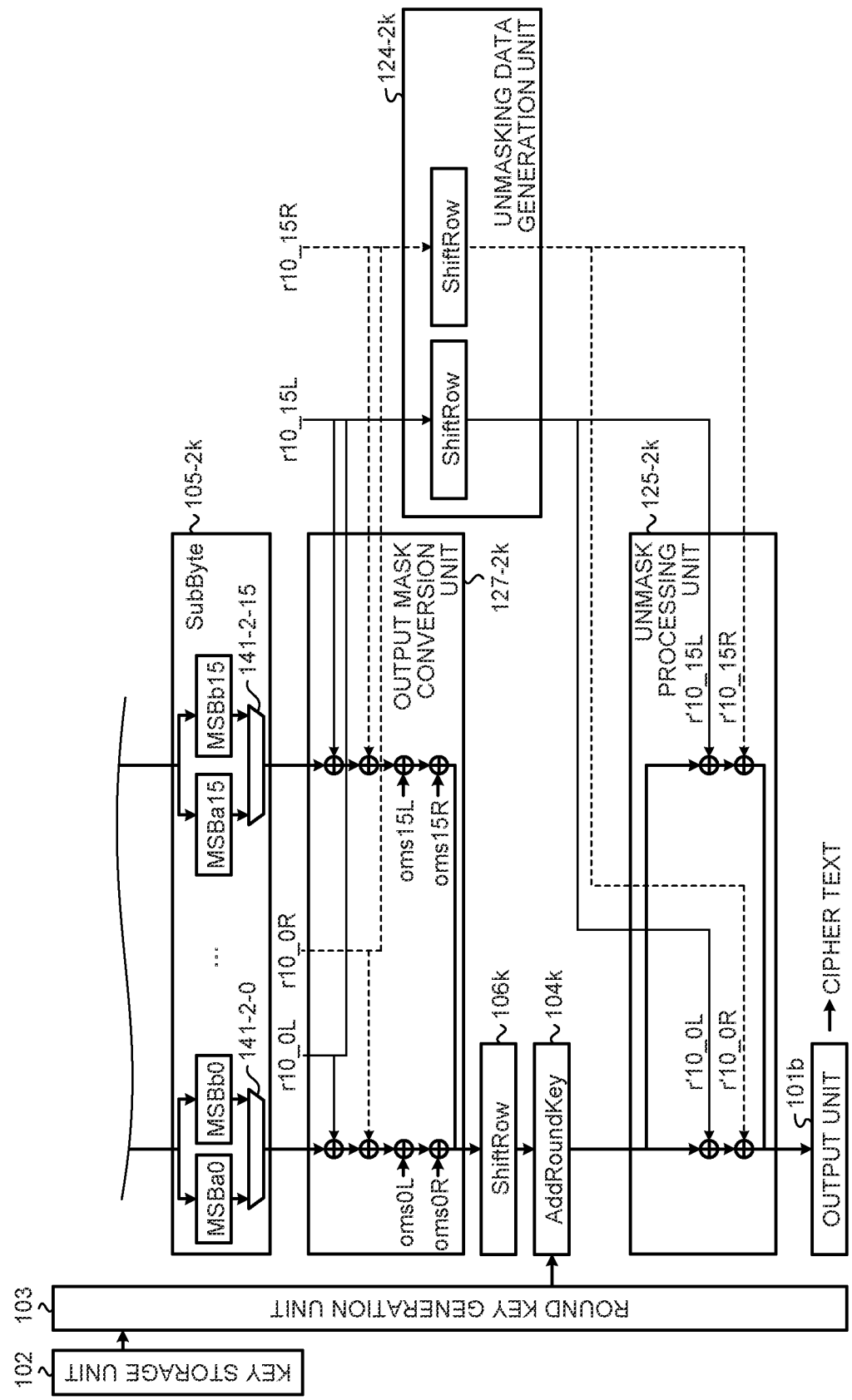
FIG. 10B is a block diagram of the encoding device according to the second embodiment.

FIG. 9, FIG. 10A, and FIG. 10B are block diagrams illustrating an example of the configuration of the encoding device according to the present embodiment. Some elements in FIG. 9, FIG. 10A, and FIG. 10B are common, but the encoding device according to the present embodiment includes elements illustrated in the respective drawings.

As illustrated in FIG. 9, the encoding device according to the present embodiment includes a mask storage unit 131-2, selection units 142-2L-0, 142-2R-0, 143-2L-0, and 143-2R-0, a SubByte 105-2, an input mask conversion unit 126-2, and an output mask conversion unit 127-2.

For convenience of description, FIG. 9 illustrates only configurations related to processing of the 0th byte, but configurations for pieces of processing of the first byte to the 15th byte are similarly provided. For example, fifteen selection units that are identified by reference numerals obtained by replacing "0" of the selection units 142-2L-0, 142-2R-0, 143-2L-0, and 143-2R-0 with 1 to 15 are provided in the encoding device. Hereinafter, in a case in which the respective bytes are not required to be distinguished from each other, the selection units 142-2L, 142-2R, 143-2L, and 143-2R are used in the description.

In FIG. 9, commonality is provided to SubBytes 105-2b to 105-2k illustrated in FIG. 10A and FIG. 10B to be illustrated as a SubByte 105-2. Similarly, commonality is provided to input mask conversion units 126-2b to 126-2k to be illustrated as an input mask conversion unit 126-2. Additionally, commonality is provided to output mask conversion units 127-2b to 127-2k to be illustrated as an output mask conversion unit 127-2. Hereinafter, in a case in which the units are not required to be distinguished from each other in the respective rounds, the SubByte 105-2, the input mask conversion unit 126-2, and the output mask conversion unit 127-2 are used in the description.

The input masks (imsL, imsR), the output masks (omsL, omsR), and the random masks (riL, riR) used in each unit in FIG. 10A and FIG. 10B are read out from the mask storage unit 131-2 to be input to each unit by the function illustrated in FIG. 9.

As illustrated in FIG. 10A and FIG. 10B, the encoding device according to the present embodiment includes an input unit 101-2a, the output unit 101b, the key storage unit 102, the round key generation unit 103, the AddRoundKeys 104a to 104k, the SubBytes 105-2b to 105-2k, the ShiftRows 106b to 106k, the MixColumns 107b to 107j, a mask processing unit 121-2a, an unmask processing unit 125-2k (an example of the arithmetic unit), the input mask conversion units 126-2b to 126-2k (an example of the arithmetic unit), the output mask conversion units 127-2b to 127-2k (an example of the arithmetic unit), mask conversion data generation units 122-2b to 122-2j (an example of the generation unit), and an unmasking data generation unit 124-2k (an example of the generation unit). Hereinafter, in a case in which the units are not required to be distinguished from each other in the respective rounds, the mask conversion data generation units 122-2b to 122-2j are described as a mask conversion data generation unit 122-2.

The mask storage unit 131-2 (FIG. 9) divides the mask of 1 byte, that is, 8 bits, to be stored as follows. The following describes an example of the mask of the 0th byte, but the same applies to the other 15 bytes.

Input mask ima0: 4 bits on the left ima0L, and 4 bits on the right ima0R

Input mask imb0: 4 bits on the left imb0L, and 4 bits on the right imb0R

Output mask oma0: 4 bits on the left oma0L, and 4 bits on the right oma0R

Output mask omb0: 4 bits on the left omb0L, and 4 bits on the right omb0R

Random mask ri_0: 4 bits on the left ri_0L, and 4 bits on the right ri_0R

In a case in which the number of Sboxes with a mask is k that is smaller than 16 (1≤k≤15), the mask storage unit 131-2 stores k corresponding input masks and k corresponding output masks.

The mask storage unit 131-2 does not necessarily store all of the masks during the entire time of the encryption processing. For example, the mask storage unit 131-2 may store necessary masks during part of the time of the encryption processing, and may delete the used masks. For example, the mask storage unit 131-2 may store the random mask for the round 1 only at the time of processing in the round 1 and processing in the round 2.

The input unit 101-2a (FIG. 10A) receives plain text from the outside. The input unit 101-2a may receive the random mask to be stored in the mask storage unit 131-2. The input unit 101-2*a* may also receive selection data. The selection data is data for designating any of the two types of masks to be selected by the selection units 142-2L, 142-2R, 143-2L, and 143-2R. The selection data is also used for selecting any one of output values (Sbox output value) of the two types of Sboxes with a mask (an Sbox with a mask A, an Sbox with a mask B) corresponding to the respective two types of masks.

The mask processing unit 121-2*a* (FIG. 10A) calculates an exclusive OR of a random mask r0 and each byte of the plain text. The mask processing unit 121-2*a* may be disposed after the AddRoundKey 104*a*.

The selection units 142-2L and 142-2R (FIG. 9) select the mask to be input to the input mask conversion unit 126-2. For example, the selection unit 142-2L receives an input of selection data sel, and selects any of imaL and imbL as the input mask imsL in accordance with a value of the selection data sel. The selection unit 142-2R receives an input of the selection data sel, and selects any of imaR and imbR as the input mask imsR in accordance with a value of the selection data sel.

The selection units 143-2L and 143-2R (FIG. 9) select the mask to be input to the output mask conversion unit 127-2. For example, the selection unit 143-2L receives an input of the selection data sel, and selects any of omaL and ombL as the output mask omsL in accordance with a value of the selection data sel. The selection unit 143-2R receives an input of the selection data sel, and selects any of omaR and ombR as the output mask omsR in accordance with a value of the selection data sel.

Any value may be designated for the selection data sel. For example, the configuration can be made such that the input mask A (ima) and the output mask A (oma) are selected in a case in which the selection data sel is 0, and the input mask B (imb) and the output mask B (omb) are selected in a case in which sel is 1.

Each of the selection units selects 4 bits on the left and selects 4 bits on the right of the mask at different timings. For example, processing of selecting any of the input masks imaL and imbL and outputting the selected input mask imsL by the selection unit 142-2L, and processing of selecting any of the input masks imaR and imbR and outputting the selected input mask imsR by the selection unit 142-2R are performed at different timings.

The value of the selection data sel may be changed for each byte, each round, and each piece of the encryption processing. The value of the selection data sel may be input from the input unit 101-2*a* as described above. The configuration may be made such that the encoding device includes the random number generation unit, and uses the selection data corresponding to a random number generated by the random number generation unit.

The input mask conversion unit 126-2 receives inputs of the intermediate data of the encryption processing, the selected input masks ims0L and ims0R, and pieces of data r'i_0L and r'i_0R for removing a random mask (where i=1 to 10. ri_0L and ri_0R are used when i=0). The data for removing a random mask is an example of the mask conversion data (first mask).

The input mask conversion unit 126-2 calculates an exclusive OR of the intermediate data of the encryption processing and the input mask ims0L, calculates an exclusive OR of a result thereof and the input mask ims0R, calculates an exclusive OR of a result thereof and the data ri_0L for removing a random mask, and calculates an exclusive OR of a result thereof and the data ri_0R for removing a random mask to be output. The same applies to the other 15 bytes.

The input mask conversion unit 126-2 performs input and calculation of the input mask ims0L, and input and calculation of the input mask ims0R at different timings. Similarly, the input mask conversion unit 126-2 performs input and calculation of the data ri_0L for removing a random mask, and input and calculation of ri_0 at different timings.

Calculation order of the input masks ims0L and ims0R may be replaced with each other. Calculation order of the data r'i_0L for removing a random mask and the data r'i_0R for removing a random mask may be replaced with each other. The calculation order may be changed at least for each byte or each round.

The SubByte 105-2 is different from the SubBytes 105*b* to 105*k* in the first embodiment in that the SubByte 105-2 includes two types of Sboxes with a mask (MSBa0 to MSBa15, MSBb0 to MSBb15) for each byte, and includes selection units 141-2-0 to 141-2-15 for selecting any of output values of the two types of Sboxes with a mask.

The SubByte 105-2 receives an input of intermediate data with a mask of 16 bytes as outputs of the AddRoundKeys 104*a* to 104*j*. The 0th byte of the intermediate data is input to MSBa0 as the Sbox with a mask of the 0th byte, and the 0th byte of an output value of MSBa0 is output from the look-up table. The 0th byte of the intermediate data is input to MSBb0 as the Sbox with a mask of the 0th byte, and the 0th byte of an output value of MSBb0 is output from the look-up table.

The selection unit 141-2-0 selects one of the output value of MSBa0 and the output value of MSBb0 to be output based on the selection data sel. Any value may be designated for the selection data sel, and the value can be connected to selection of the input mask and the output mask. For example, the configuration can be made such that the input mask A (ima), the output mask A (oma), and the output value of MSBa0 are selected in a case in which the selection data sel is 0, and the input mask B (imb), the output mask B (omb), and the output value of MSBb0 are selected in a case in which sel is 1.

The SubByte 105-2 similarly performs calculation for the other 15 bytes, and outputs the output value of the Sbox with a mask.

Figure 11:
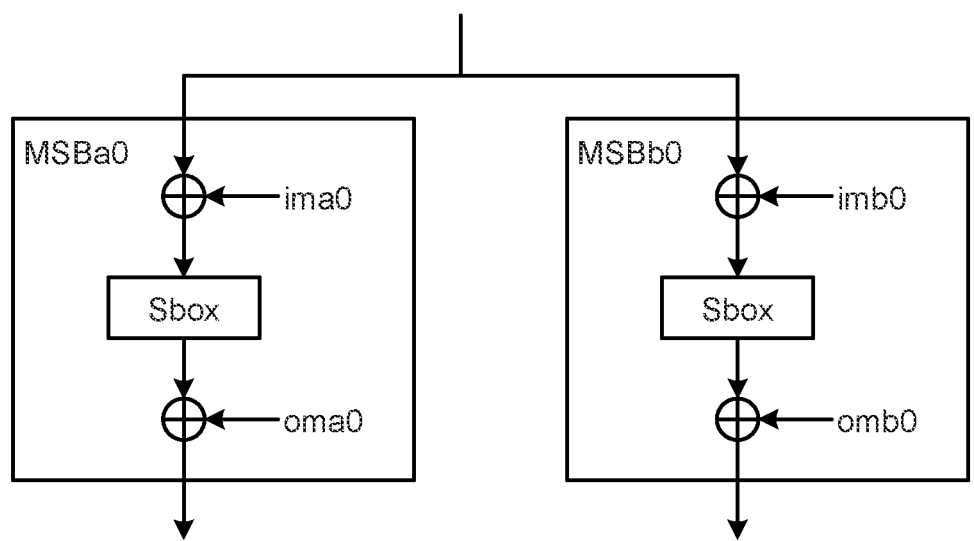
FIG. 11 is a block diagram of the Sbox with a mask.

FIG. 11 is a block diagram illustrating an example of a configuration of the Sbox with a mask (MSBa0, MSBb0) used in the SubByte 105-2. The Sbox with a mask functions as a look-up table that inputs 1 byte and outputs 1 byte. The input value and the output value both take values from 0 to 255.

The look-up table of MSBa0 as the 0th byte of the Sbox with a mask inputs an exclusive OR of the input value and the input mask ima0 to the Sbox, and causes an exclusive OR of the output of the Sbox and the output mask oma0 to be the output value.

The look-up table of MSBb0 as the 0th byte of the Sbox with a mask inputs an exclusive OR of the input value and the input mask imb0 to the Sbox, and causes an exclusive OR of the output of the Sbox and the output mask omb0 to be the output value. The same applies to the other 15 bytes (MSBa1 to MSBa15, MSBb1 to MSBb15).

In the embodiment, the input/output masks of the sixteen Sboxes with a mask are different from each other. The Sbox with a mask of each byte is the same every time even in a case of performing the encryption processing multiple times, and the same in the respective rounds. The configuration of the Sbox with a mask is not limited thereto. For example, the prepared sixteen Sboxes with a mask may be shuffled to be used for each piece of the encryption processing to be performed, or for each round. The Sboxes with a mask the number of which is smaller than sixteen may be prepared, and may be used in a duplicated manner between bytes. One Sbox with a mask may be prepared, the same Sbox with a mask may be used for all of the bytes.

The process returns to FIG. 10A and FIG. 10B, the output mask conversion unit 127-2 receives inputs of the intermediate data of the encryption processing (the output value of the SubByte 105-2), the selected output masks oms0L and oms0R, and the random masks ri_0L and ri_0R (i=1 to 10).

The output mask conversion unit 127-2 calculates an exclusive OR of the intermediate data of the encryption processing and the random mask ri_0L, calculates an exclusive OR of a result thereof and the random mask ri_0R to be output, calculates an exclusive OR of a result thereof and the output mask oms0L, and calculates an exclusive OR of a result thereof and the output mask oms0R. The same applies to the other 15 bytes.

The output mask conversion unit 127-2 performs input and calculation of the output mask oms0L, and input and calculation of the output mask oms0R at different timings. The output mask conversion unit 127-2 performs input and calculation of the random mask ri_0L, and input and calculation of the random mask ri_0R at different timings. The reason why the input and calculation thereof are performed at different timings is the same as that for the input mask conversion unit 126-2.

Calculation order of the input masks ims0L and ims0R may be replaced with each other. Calculation order of the random mask ri_0L and the random mask ri_0 may be replaced with each other. The calculation order may be changed at least for each byte or each round.

The mask conversion data generation unit 122-2 reads out 4 bits on the left ri_0L to ri_15L of the sixteen random masks from the mask storage unit 131-2, and treats one mask as 8 bits assuming 4 bits thereof as higher-order 4 bits and lower-order 4 bits as 0 to be data of 16 bytes. The mask conversion data generation unit 122-2 performs ShiftRow processing on the data of 16 bytes. The mask conversion data generation unit 122-2 performs MixColumn processing on the ShiftRow output value. The mask conversion data generation unit 122-2 causes MixColumn output values to be pieces of data r'i_0L to r'i_15L for removing a random mask.

Similarly, the mask conversion data generation unit 122-2 reads out 4 bits on the right ri_0R to ri_15R of the sixteen random masks from the mask storage unit 131-2, and treats one mask as 8 bits assuming the 4 bits thereof as lower-order 4 bits and higher-order 4 bits as 0 to be data of 16 bytes. The mask conversion data generation unit 122-2 performs ShiftRow processing on the data of 16 bytes. The mask conversion data generation unit 122-2 performs MixColumn processing on the ShiftRow output value. The mask conversion data generation unit 122-2 causes the MixColumn output values to be pieces of data r'i_0R to r'i_15R for removing a random mask.

The mask conversion data generation unit 122-2 calculates and outputs the pieces of data r'i_0L to r'i_15L for removing a random mask and the pieces of data r'i_0R to r'i_15R for removing a random mask at different timings.

The mask conversion data generation unit 122-2 may generate the MixColumn output values of the pieces of data r'i_0L to r'i_15L for removing a random mask using the following method. First, the mask conversion data generation unit 122-2 reads out the 4 bits on the left ri_0L to ri_15L of the sixteen output masks from the mask storage unit 131-2, and treats one mask as 8 bits assuming the 4 bits as lower-order 4 bits, and higher-order 4 bits as 0. The mask conversion data generation unit 122-2 performs ShiftRow processing on the sixteen output masks. The mask conversion data generation unit 122-2 performs MixColumn processing on the ShiftRow output value, and multiply a result thereof by 16.

The same processing as that described above is performed excluding the final round of AES. The MixColumn processing is not performed in the final round of AES. That is, only the pieces of processing of the SubByte 105-2$k$, the ShiftRow 106$k$, and the AddRoundKey 104$k$ are performed.

The unmasking data generation unit 124-2$k$ reads out 4 bits on the left r10_0L to r10_15L of the sixteen random masks from the mask storage unit 131-2, and treats one mask as 8 bits assuming the 4 bits thereof as higher-order 4 bits and lower-order 4 bits as 0 to be data of 16 bytes. The unmasking data generation unit 124-2$k$ performs ShiftRow processing on the data of 16 bytes. The unmasking data generation unit 124-2$k$ causes ShiftRow output values to be pieces of data r'10_0L to r'10_15L for unmasking.

Similarly, the unmasking data generation unit 124-2$k$ reads out 4 bits on the right r10_0R to r10_15R of the sixteen random masks from the mask storage unit 131-2, and treats one mask as 8 bits assuming the 4 bits thereof as lower-order 4 bits and higher-order 4 bits as 0 to be data of 16 bytes. The unmasking data generation unit 124-2$k$ performs ShiftRow processing on the data of 16 bytes. The unmasking data generation unit 124-2$k$ causes the ShiftRow output values to be pieces of data r'10_0R to r'10_15R for unmasking.

The unmasking data generation unit 124-2$k$ calculates and outputs the pieces of data r'10_0L to r'10_15L for unmasking and the pieces of data r'10_0R to r'10_15R for unmasking at different timings.

The unmask processing unit 125-2$k$ receives inputs of cipher text with a mask of 16 bytes, the pieces of data r'10_0L to r'10_15L for unmasking, and the pieces of data r'10_0R to r'10_15R for unmasking. The unmask processing unit 125-2$k$ calculates an exclusive OR of the cipher text with a mask and the pieces of data r'10_0L to r'10_15L for unmasking, calculates an exclusive OR of a result thereof and the pieces of data r'10_0R to r'10_15R for unmasking, and inputs cipher text as a result thereof to the output unit 101$b$.

Calculation order of the pieces of data r'10_0L to r'10_15L for unmasking and the pieces of data r'10_0R to r'10_15R for unmasking may be replaced with each other. The AddRoundKey processing may be performed after the unmask processing unit 125-2$k$.

Figure 12:
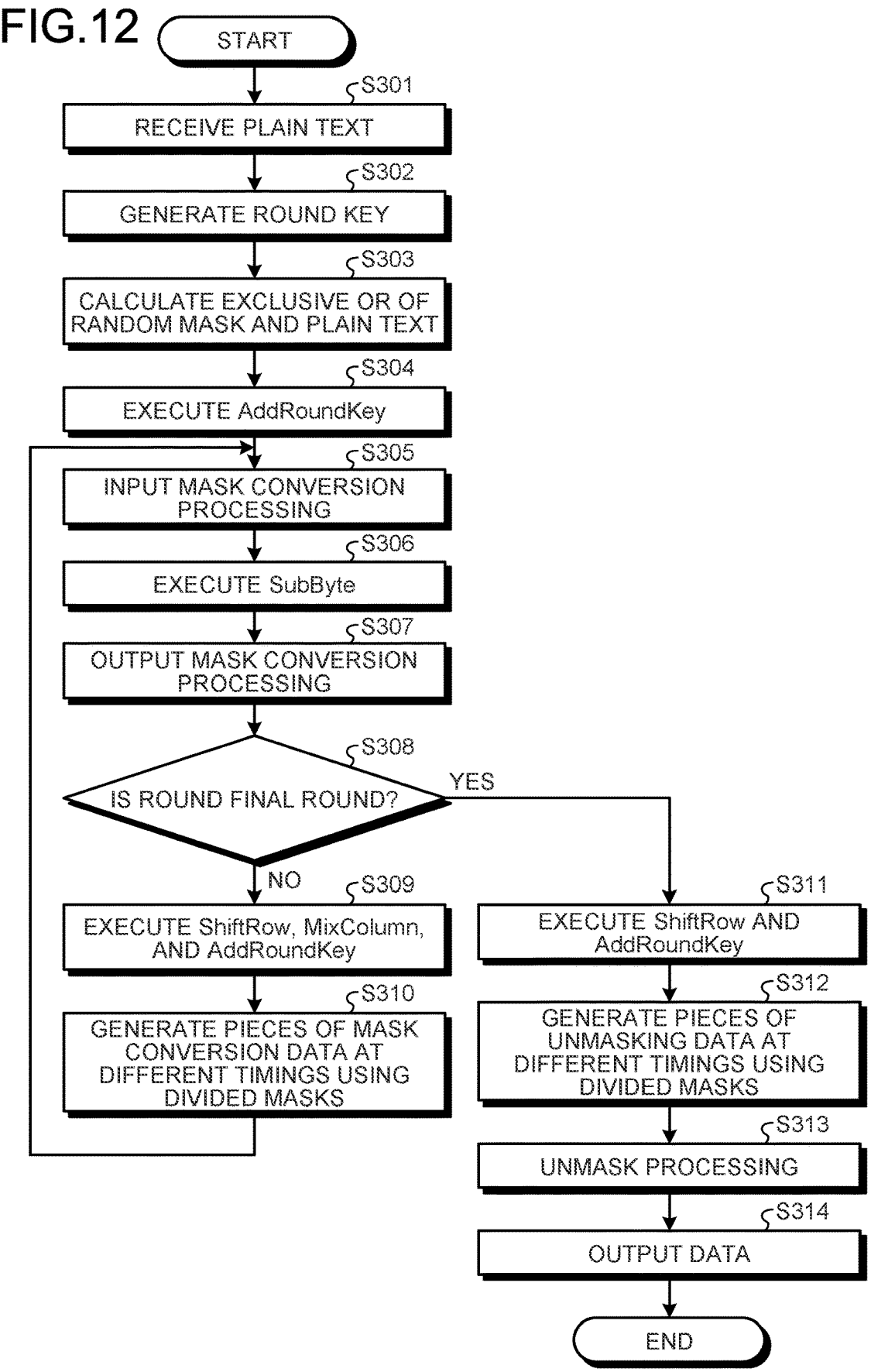
FIG. 12 is a flowchart of encoding processing in the second embodiment.

Next, the following describes the encoding processing performed by the encoding device according to the second embodiment configured as described above. FIG. 12 is a flowchart illustrating an example of the encoding processing according to the second embodiment.

Step S301 and Step S302 are the same as Step S101 and Step S102 in FIG. 5 that illustrates the encoding processing of the first embodiment.

The mask processing unit 121-2$a$ calculates an exclusive OR of the random mask r0 and each byte of the plain text (Step S303).

The AddRoundKey 104$a$ performs AddRoundKey conversion processing on the plain text on which mask processing is performed by the mask processing unit 121-2$a$ (Step S304).

The input mask conversion unit 126-2$b$ converts the respective divided masks (input masks imsL and imsR) at different timings (Step S305). Before this processing, any of imaL and imbL is selected as the input mask imsL in accordance with a value of the selection data sel. Similarly, any of imaR and imbR is selected as the input mask imsR in accordance with a value of the selection data sel.

The SubByte 105-2b receives an input of the intermediate data with a mask of 16 bytes as an output of the AddRoundKey 104a, and outputs an output value of the Sbox with a mask. At this point, the selection unit 141-2 in the SubByte 105-2b selects one of the output value of MSBa0 and the output value of MSBb0 to be output based on the selection data sel (Step S306).

The output mask conversion unit 127-2b converts the respective divided masks (output masks omsL and omsR) at different timings (Step S307). Before this processing, any of omaL and ombL is selected as the input mask omsL in accordance with a value of the selection data sel. Similarly, any of omaR and ombR is selected as the input mask omsR in accordance with a value of the selection data sel. The selection of the input mask and the selection of the output mask are performed at different timings.

The encoding device determines whether the round is the final round (Step S308). If the round is not the final round (No at Step S308), processing by the ShiftRow 106b, processing by the MixColumn 107b, and processing by the AddRoundKey 104b are performed in order (Step S309).

The mask conversion data generation unit 122-2b uses the divided masks (4 bits on the left of the random mask, 4 bits on the right of the random mask) to calculate and output the pieces of data r'i_0L to r'i_15L for removing a random mask and the pieces of data r'i_0R to r'i_15R for removing a random mask at different timings (Step S310). Thereafter, the process returns to Step S305, and the same processing is repeated for the next round.

If it is determined that the round is the final round at Step S308 (Yes at Step S308), processing of the final round is performed as follows.

First, processing by the ShiftRow 106k and processing by the AddRoundKey 104k are performed in order (Step S311). The unmasking data generation unit 124-2k uses the divided masks to calculate and output the pieces of data r'10_0L to r'10_15L for unmasking and the pieces of data r'10_0R to r'10_15R for unmasking at different timings (Step S312).

The unmask processing unit 125-2k performs unmask processing using the pieces of data r'10_0L to r'10_15L for unmasking and unmask processing using the pieces of data r'10_0R to r'10_15R for unmasking at different timings (Step S313). The output unit 110b outputs data as a processing result of the unmask processing unit 125-2k (Step S314), and ends the encoding processing.

Figure 13A:
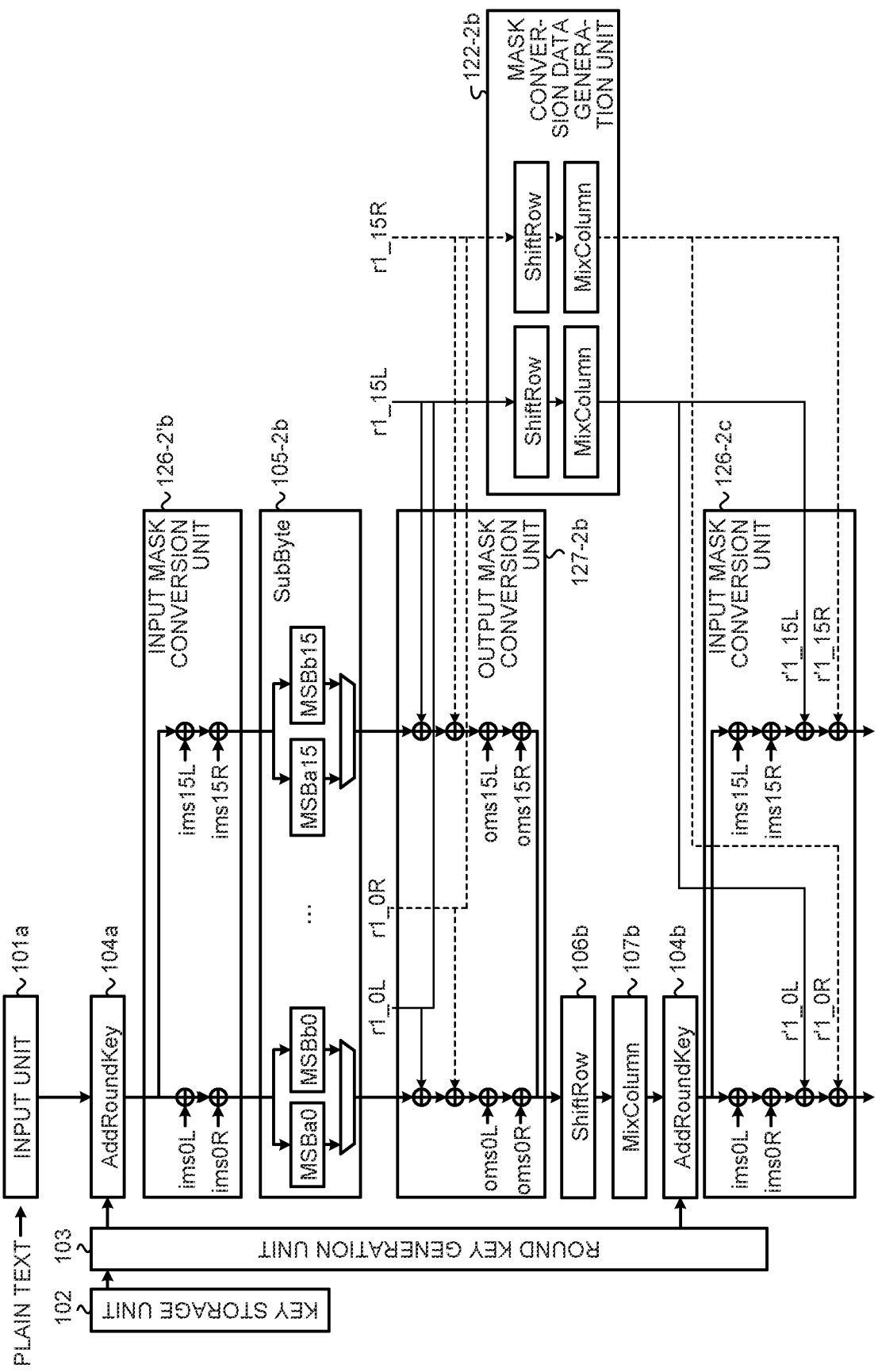
FIG. 13A is a block diagram illustrating an example of an encoding device according to a modification.
Figure 13B:
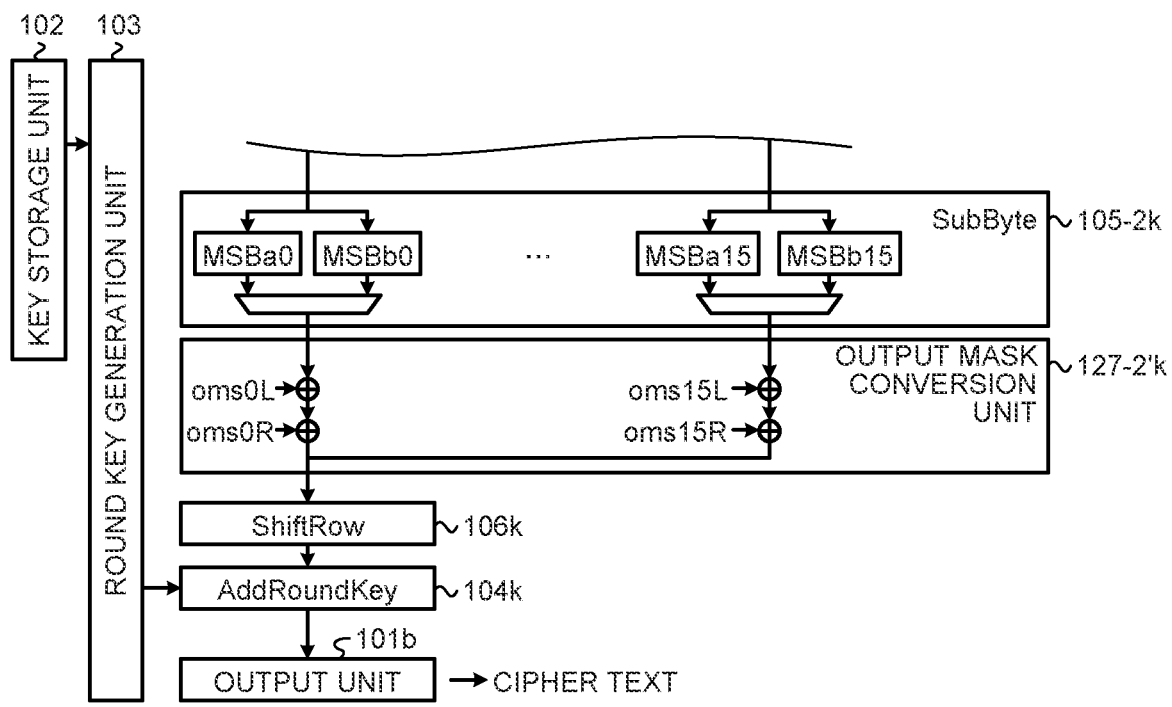
FIG. 13B is a block diagram illustrating an example of the encoding device according to the modification.

The encoding device may be configured not to use the random masks r0_0R to r0_15R and r10_0R to r10_15R. FIG. 13A and FIG. 13B are block diagrams illustrating an example of the encoding device according to a modification that is configured as described above. The encoding device according to the modification is different from that in the second embodiment in that the mask processing unit 121-2a, the unmasking data generation unit 124-2k, and the unmask processing unit 125-2k are eliminated, and in functions of an input mask conversion unit 126-2'b and an output mask conversion unit 127-2'k.

The input mask conversion unit 126-2'b is different from the input mask conversion unit 126-2b in the second embodiment in that the exclusive OR using the random masks r0_0R to r0_15R is not executed.

The output mask conversion unit 127-2'k is different from the output mask conversion unit 127-2k in the second embodiment in that the exclusive OR using the random masks r10_0R to r10_15R is not executed.

Figure 14A:
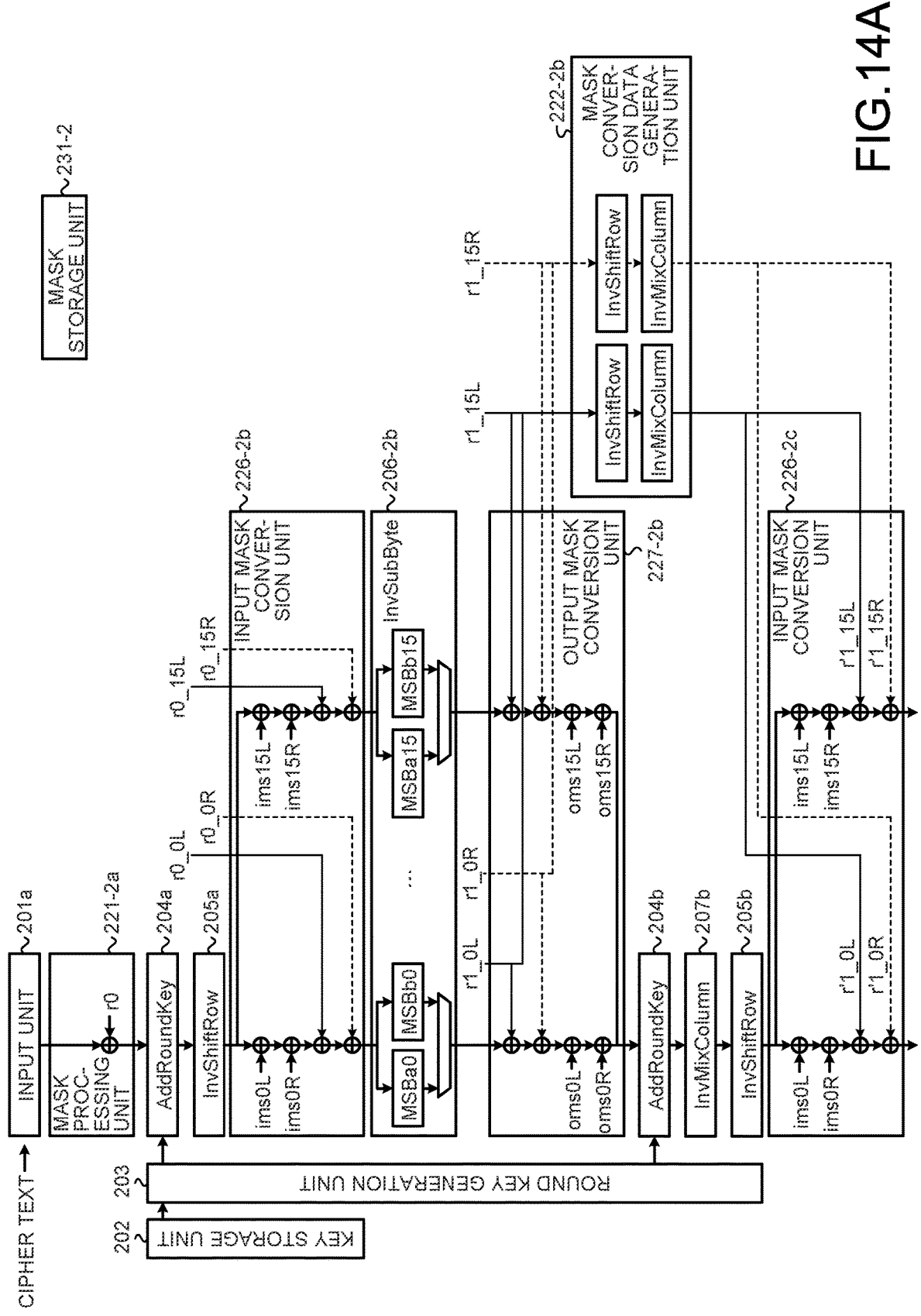
FIG. 14A is a block diagram of a decoding device according to the second embodiment.
Figure 14B:
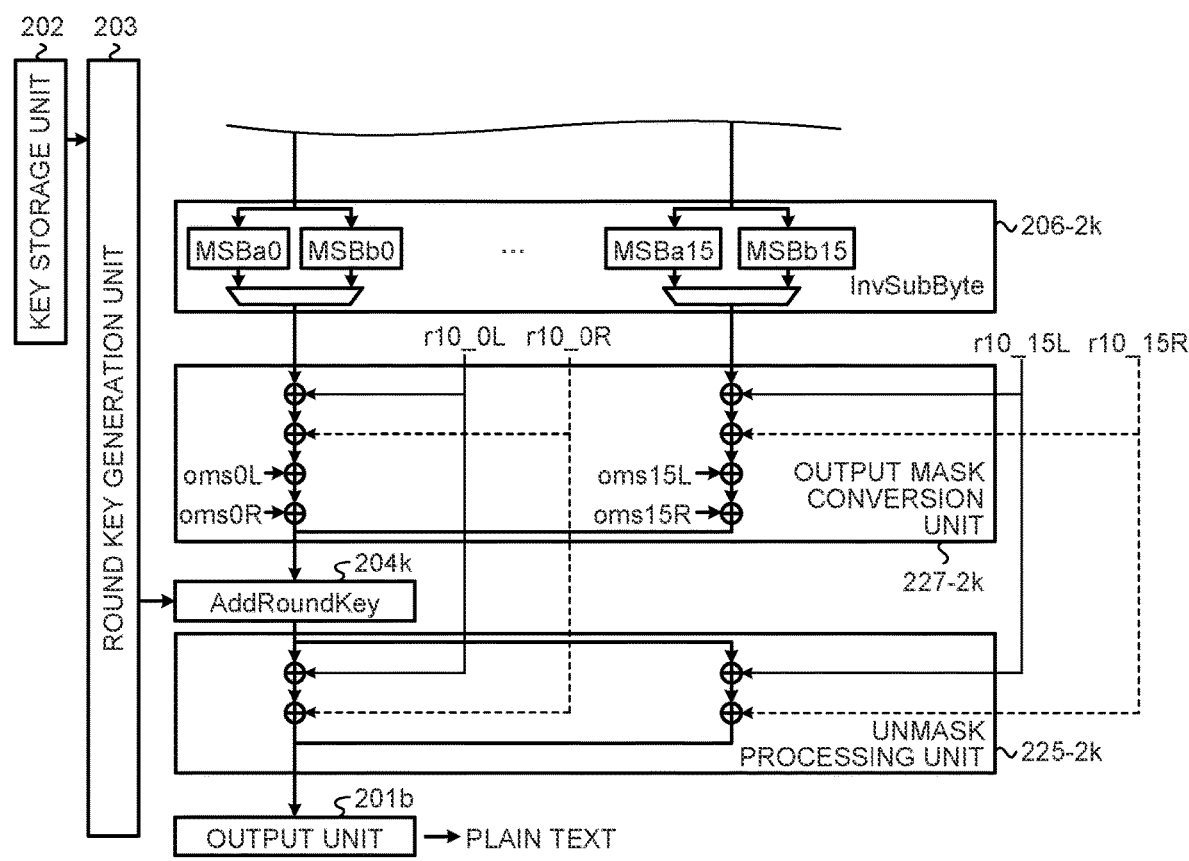
FIG. 14B is a block diagram of the decoding device according to the second embodiment.

Next, the following describes the decoding device according to the second embodiment. FIG. 14A and FIG. 14B are block diagrams illustrating an example of a configuration of the decoding device according to the present embodiment. The same configuration as that of the decoding device in the first embodiment is denoted by the same reference numeral, and redundant description thereof will not be repeated.

The decoding device according to the second embodiment includes the input unit 201a, the output unit 201b, the key storage unit 202, the round key generation unit 203, the AddRoundKeys 204a to 204k, the InvShiftRows 205a to 205j, InvSubBytes 206-2b to 206-2k, the InvMixColumns 207b to 207j, a mask storage unit 231-2, a mask processing unit 221-2a, an unmask processing unit 225-2k, input mask conversion units 226-2b to 226-2k, output mask conversion units 227-2b to 227-2k, and mask conversion data generation units 222-2b to 222-2j.

The InvSubBytes 206-2b to 206-2k, the mask storage unit 231-2, the mask processing unit 221-2a, the input mask conversion units 226-2b to 226-2k, and the output mask conversion units 227-2b to 227-2k may respectively have the same configuration as that of the SubBytes 105-2b to 105-2k, the mask storage unit 131-2, the mask processing unit 121-2a, the input mask conversion units 126-2b to 126-2k, and the output mask conversion units 127-2b to 127-2k of the encoding device.

The unmask processing unit 225-2k is different from the unmask processing unit 125-2k of the encoding device in that the 4 bits on the left r10_0L to r10_15L of the random mask and the 4 bits on the right r10_0R to r10_15R of the random mask read out from the mask storage unit 231 are used in place of the pieces of data r'10_0L to r'10_15L for unmasking and the pieces of data r'10_0R to r'10_15R for unmasking.

The mask conversion data generation units 222-2b to 222-2j each include the InvMixColumn and the InvShiftRow in place of the ShiftRow and the MixColumn in the mask conversion data generation units 122-2b to 122-2j.

Figure 15:
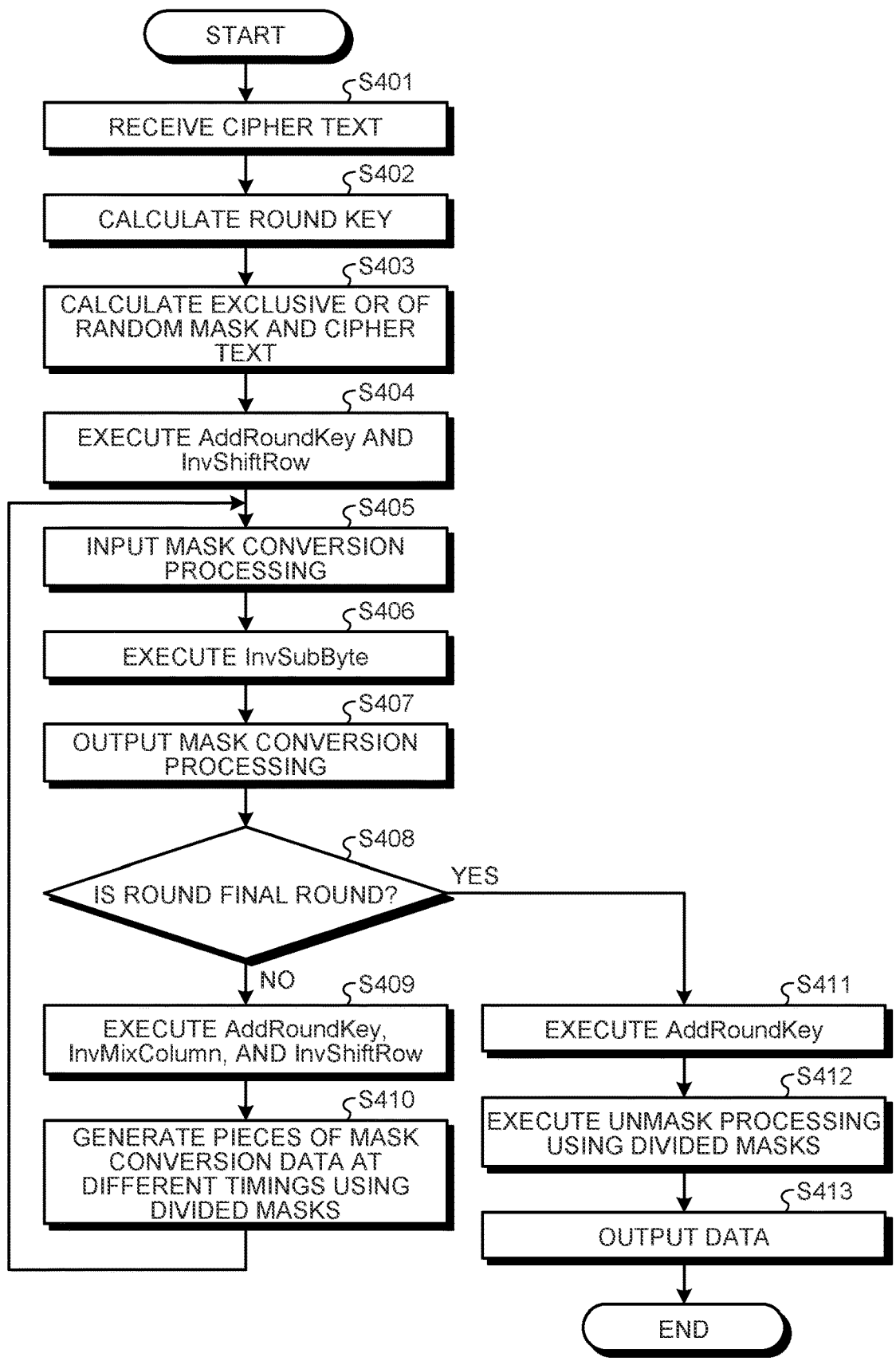
FIG. 15 is a flowchart of decoding processing in the second embodiment.

Next, the following describes decoding processing performed by the decoding device according to the second embodiment that is configured as described above. FIG. 15 is a flowchart illustrating an example of decoding processing in the second embodiment.

First, the input unit 201a receives cipher text (Step S401). Next, the round key generation unit 203 calculates the eleven round keys d203a to d203k of 128 bits using the secret key stored in the key storage unit 202 (Step S402).

The mask processing unit 221-2a calculates an exclusive OR of the random mask r0 and each byte of the cipher text (Step S403).

Processing by the AddRoundKey 204a and processing by the InvShiftRow 205a are performed on the cipher text (Step S404).

The input mask conversion unit 226-2b converts the respective divided masks (input masks imsL and imsR) at different timings (Step S405). Before this processing, any of imaL and imbL is selected as the input mask imsL in accordance with a value of the selection data sel. Similarly, any of imaR and imbR is selected as the input mask imsR in accordance with a value of the selection data sel.

The InvSubByte 206-2b receives an input of the intermediate data with a mask of 16 bytes as an output of the AddRoundKey 204a, and outputs an output value of the Sbox with a mask. At this point, the selection unit in the InvSubByte 206-2b selects one of the output value of MSBa0 and the output value of MSBb0 to be output based on the selection data sel (Step S406).

The output mask conversion unit 227-2b converts the respective divided masks (output masks omsL and omsR) at different timings (Step S407). Before this processing, any of omaL and ombL is selected as the input mask omsL in accordance with a value of the selection data sel. Similarly, any of omaR and ombR is selected as the input mask omsR in accordance with a value of the selection data sel. The selection of the input mask and the selection of the output mask are performed at different timings.

The decoding device determines whether the round is the final round (Step S408). If the round is not the final round (No at Step S408), processing by the AddRoundKey 204b, processing by the InvMixColumn 207b, and processing by the InvShiftRow 205b are performed in order (Step S409).

The mask conversion data generation unit 222-2b uses the divided masks (4 bits on the left of the random mask, and 4 bits on the right of the random mask) to calculate and output the pieces of data r'i_0L to r'i_15L for removing a random mask and the pieces of data r'i_0R to r'i_15R for removing a random mask at different timings (Step S410). Thereafter, the process returns to Step S405, and the same processing is repeated for the next round.

If it is determined that the round is the final round at Step S408 (Yes at Step S408), processing of the final round is performed as follows.

First, processing is performed by the AddRoundKey 204k (Step S411). The unmask processing unit 225-2k performs unmask processing using the 4 bits on the left r10_0L to r10_15L of the random mask and unmask processing using the 4 bits on the right r10_0R to r10_15R of the random mask at different timings (Step S412). The output unit 110b outputs data as a result of the unmask processing (Step S413), and ends the decoding processing.

Third Embodiment

A third embodiment takes a countermeasure against a mask that is different from that in the first embodiment and the second embodiment. In the present embodiment, the mask conversion data for the next round is generated by using the mask generated by the mask conversion unit in a previous round. Also in the present embodiment, the divided masks obtained by dividing the mask are used for an arithmetic operation at different timings. Terms used in the present embodiment are the same as those in the first embodiment unless specifically noted.

A linear transformation of 1-byte input/output is represented as $\Phi$. An inverse conversion of $\Phi$ is represented as $\Phi^{-1}$. $\Phi(a)+\Phi(b)=\Phi(a+b)$ is established, and $\Phi^{-1}(\Phi(a))=a$ is established. Linear transformations $\Phi 0$ to $\Phi 15$ are defined for 16 bytes of intermediate data of the encryption processing. The linear transformations $\Phi 0$ to $\Phi 15$ may be different from each other, or may be partially or entirely the same. In the following description, the linear transformations $\Phi 0$ to $\Phi 15$ are assumed to be different from each other. The Sbox with a mask is defined for the linear transformation $\Phi 0$. This Sbox with a mask is represented as MSB0. f0L and f0R are optional functions of 4-bit input/output. f0L and f0R may be functions of 4-bit input or 8-bit output. The same applies to the other 15 bytes.

The random masks of 16 bytes are represented as r0_0 to r0_15. These are collectively represented as r0. The random mask of the j-th byte in the i-th round is represented as ri_j. ri_0 to ri_15 are collectively represented as ri.

4 bits on the left of the random mask ri_j are represented as ri_jL, and 4 bits on the right of the random mask ri_j are represented as ri_jR. The random masks ri_0L to ri_15L are collectively represented as riL. The random masks ri_0R to ri_15R are collectively represented as riR.

In the present embodiment, similarly to the first embodiment, the mask of 8 bits applied to the intermediate data of 1 byte, that is, 8 bits, is divided into two parts to be treated in units of 4 bits. A division method is not limited thereto, and the mask may be divided into four parts in units of 2 bits, or may be divided into eight parts in units of 1 bit, for example.

The following describes a configuration example of the encoding device and the decoding device according to the present embodiment. Functions overlapping with those in FIG. 1, FIG. 2, the first embodiment, and the second embodiment are denoted by the same reference numerals, and redundant description thereof will not be repeated.

Figure 16A:
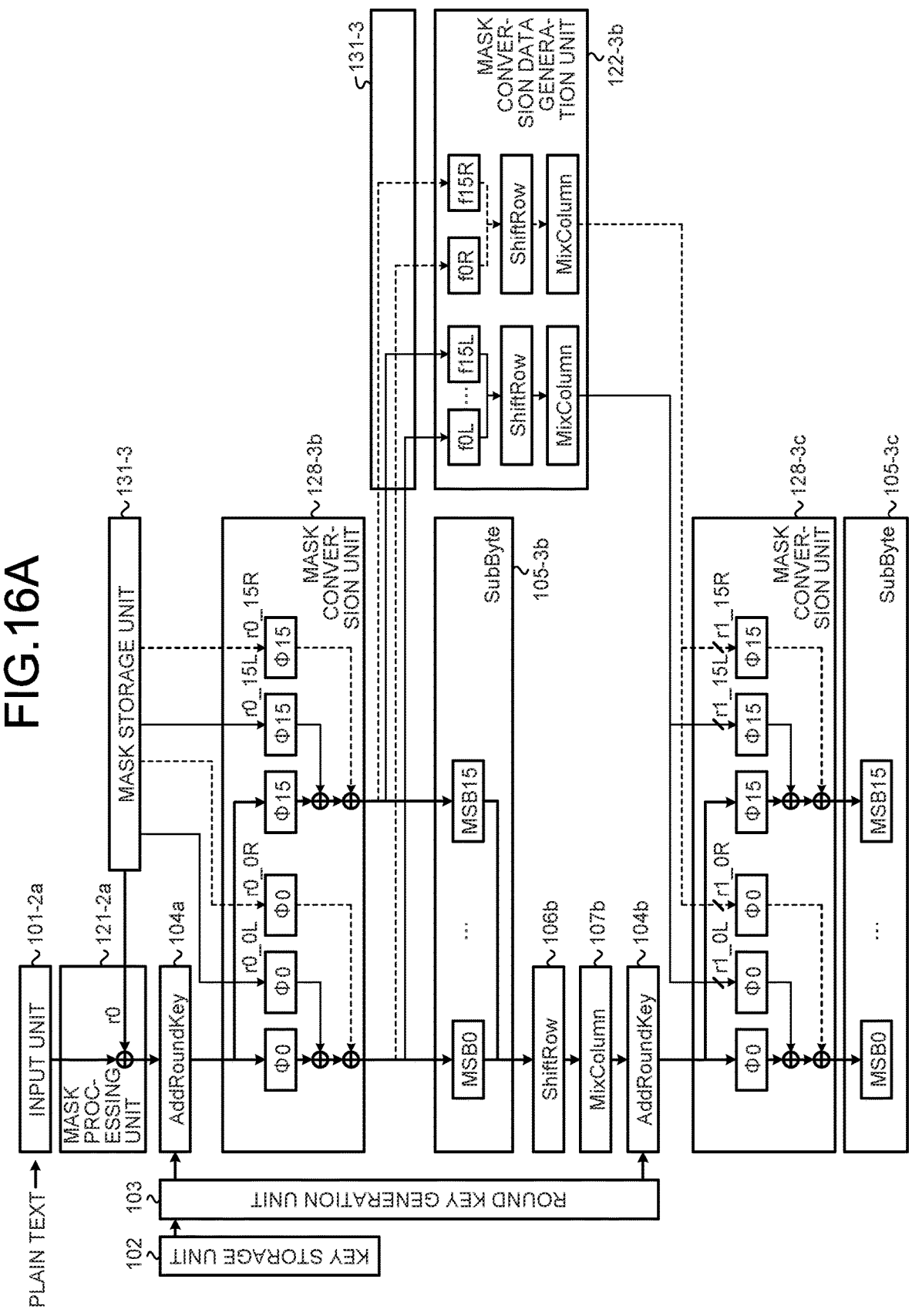
FIG. 16A is a block diagram of an encoding device according to a third embodiment.
Figure 16B:
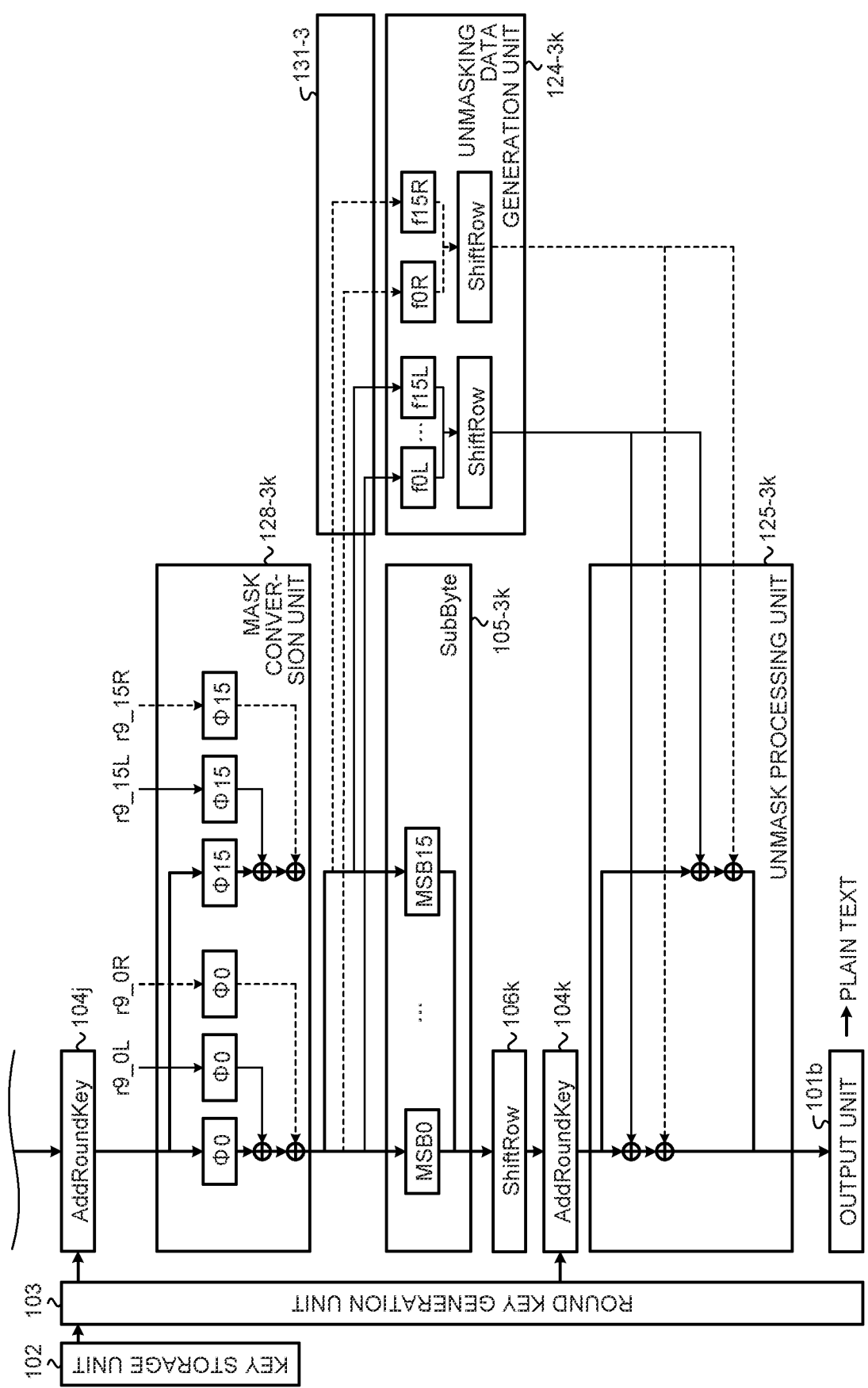
FIG. 16B is a block diagram of the encoding device according to the third embodiment.

FIG. 16A and FIG. 16B are block diagrams illustrating an example of a configuration of the encoding device according to the present embodiment. The encoding device according to the present embodiment includes the input unit 101-2a, the output unit 101b, the key storage unit 102, the round key generation unit 103, the AddRoundKeys 104a to 104k, SubBytes 105-3b to 105-3k, the ShiftRows 106b to 106k, the MixColumns 107b to 107j, a mask storage unit 131-3, the mask processing unit 121-2a, an unmask processing unit 125-3k (an example of the arithmetic unit), mask conversion units 128-3b to 128-3j (an example of the arithmetic unit), mask conversion data generation units 122-3b to 122-3j (an example of the generation unit), and an unmasking data generation unit 124-3k (an example of the generation unit).

Hereinafter, in a case in which the units are not required to be distinguished from each other in the respective rounds, the SubBytes 105-3b to 105-3k are described as a SubByte 105-3, the mask conversion units 128-3b to 128-3j are described as a mask conversion unit 128-3, and the mask conversion data generation units 122-3b to 122-3j are described as a mask conversion data generation unit 122-3.

The mask storage unit 131-3 divides a mask r0_0 of 1 byte, that is, 8 bits, into 4 bits on the left r0_0L and 4 bits on the right r0_0R to be stored therein. The same applies to the other 15 bytes. The mask storage unit 131-3 may store data in the middle of calculation of the mask.

The mask storage unit 131-3 does not necessarily store all of the masks during the entire time of the encryption processing. For example, the mask storage unit 131-3 may store necessary masks during part of the time of the encryption processing, and may delete the used masks. For example, the mask storage unit 131-3 may delete the mask r0_0 after processing in the round 2.

The mask conversion unit 128-3 converts intermediate data of the encryption processing by the linear transformation $\Phi 0$. The mask conversion unit 128-3 calculates an exclusive OR of a result thereof and a result obtained by converting the input mask r0_0L by the linear transformation $\Phi 0$. The mask conversion unit 128-3 calculates an exclusive OR of a result thereof and a result obtained by converting the input mask r0_0R by the linear transformation $\Phi 0$. Hereinafter, a result thereof is represented as $\Phi 0(x)$.

The mask conversion unit 128-3 inputs $\Phi 0(x)$ to the SubByte 105-3. Hereinafter, 4 bits on the left of $\Phi 0(x)$ are represented as $\Phi 0(x)L$, and 4 bits on the right thereof are represented as $\Phi 0(x)R$. The mask conversion unit 128-3 stores $\Phi 0(x)L$ and $\Phi 0(x)R$ in the mask storage unit 131-3 to be distinguished from each other. It can be interpreted that $\Phi 0(x)L$ and $\Phi 0(x)R$ as calculation results of the mask conversion unit 128-3 correspond to the divided masks to be used in the next round. The mask conversion unit 128-3 reads out and calculates the mask r0_0L and the mask r0_0R at different timings. The same applies to the other 15 bytes.

The masks r0_0L to r0_15L may be read out and calculated at the same timing. The masks r0_0R to r0_15R may be read out and calculated at the same timing.

The SubByte 105-3 receives an input of the intermediate data of the encryption processing subjected to linear transformation. The 0th byte of the intermediate data is input to MSB0 as the Sbox with a mask of the 0th byte, and the 0th byte of the output value of MSB0 is output from the look-up table.

Figure 17:
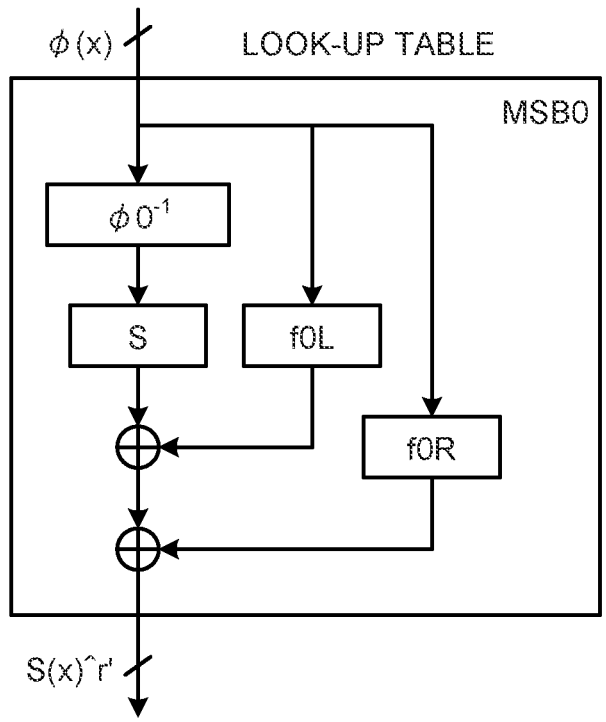
FIG. 17 is a block diagram of the Sbox with a mask.
Figure 18:
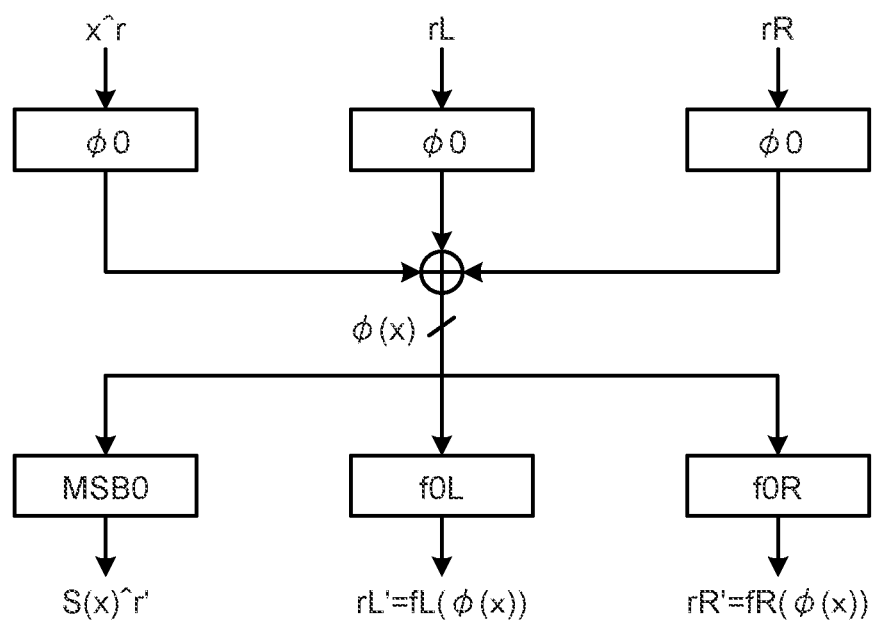
FIG. 18 is a diagram illustrating a relation between input and output of the Sbox with a mask.

FIG. 17 is a block diagram illustrating an example of a configuration of the Sbox with a mask (MSB0) used in the SubByte 105-3. FIG. 18 is a diagram illustrating a relation between input and output of the Sbox with a mask. The Sbox with a mask functions as a look-up table that inputs 1 byte and outputs 1 byte. The input value and the output value both take values from 0 to 255.

The look-up table of MSB0 as the 0th byte of the Sbox with a mask functions as follows. A result $\Phi 0(x)$ obtained by calculating the input value x by conversion of the linear transformation $\Phi 0$ is input to the Sbox with a mask. An exclusive OR of an Sbox output and a result obtained by calculating the input value by the function f0L is calculated. An exclusive OR of a result thereof and a result obtained by calculating the input value by the function f0R is calculated. A result thereof is caused to be the output value of MSB0 with respect to the input value. The same applies to the other 15 bytes.

In the embodiment, the input/output masks of the sixteen Sboxes with a mask are different from each other. The Sbox with a mask of each byte is the same every time even in a case of performing the encryption processing multiple times, and the same in the respective rounds. The configuration of the Sbox with a mask is not limited thereto. For example, the prepared sixteen Sboxes with a mask may be shuffled to be used for each piece of the encryption processing to be performed, or for each round. The Sboxes with a mask the number of which is smaller than sixteen may be prepared, and may be used in a duplicated manner between bytes. One Sbox with a mask may be prepared, and the same Sbox with a mask may be used for all of the bytes.

The mask conversion data generation unit 122-3 generates mask conversion data (an example of the first mask) to be input to the mask conversion unit 128-3 in the next round. For example, the mask conversion data generation unit 122-3 reads out $\Phi 0(x)$L to $\Phi 15(x)$L from the mask storage unit 131-3, and calculates the function f0L for each of the sixteen pieces of data of 4 bits that are read out. The mask conversion data generation unit 122-3 generates data of 16 bytes by causing the result of the function f0L to be higher-order 4 bits and causing lower-order 4 bits to be 0, and performs ShiftRow processing on the data. In a case in which f0L is a function of 4-bit input and 8-bit output, the mask conversion data generation unit 122-3 can perform ShiftRow processing on the data of 16 bytes including sixteen outputs of f0L. The mask conversion data generation unit 122-3 performs MixColumn processing on the ShiftRow output value. The mask conversion data generation unit 122-3 causes the MixColumn output value to be inputs r1_0L to r1_15L of the mask conversion unit 128-3 for the next.

The mask conversion data generation unit 122-3 reads out $\Phi 0(x)$R to $\Phi 15(x)$R from the mask storage unit 131-3, and calculates the function f0R for each of the sixteen pieces of data of 4 bits that are read out. The mask conversion data generation unit 122-3 generates data of 16 bytes by causing the result of the function f0R to be lower-order 4 bits and causing higher-order 4 bits to be 0, and performs ShiftRow processing on the data. In a case in which f0R is a function of 4-bit input and 8-bit output, the mask conversion data generation unit 122-3 can perform ShiftRow processing on the data of 16 bytes including sixteen outputs of f0R. The mask conversion data generation unit 122-3 performs MixColumn processing on the ShiftRow output value. The mask conversion data generation unit 122-3 causes MixColumn output values to be inputs r1_0R to r1_15R of the mask conversion unit 128-3 for the next.

The mask conversion data generation unit 122-3 performs calculation of r1_0L to r1_15L and calculation of r1_0R to r1_15R at different timings.

The same processing as that described above is performed excluding the final round of AES. The MixColumn processing is not performed in the final round of AES. That is, only the pieces of processing of the SubByte 105-3k, the ShiftRow 106k, and the AddRoundKey 104k are performed.

The unmasking data generation unit 124-3k generates unmasking data (an example of the first mask) to be input to the unmask processing unit 125-3k. For example, the unmasking data generation unit 124-3k reads out $\Phi 0(x)$L to $\Phi 15(x)$L from the mask storage unit 131-3, and calculates the function f0L for each of the sixteen pieces of data of 4 bits that are read out. The mask conversion data generation unit 122-3k generates data of 16 bytes by causing the result of the function f0L to be higher-order 4 bits and causing lower-order 4 bits to be 0, and performs ShiftRow processing on the data. In a case in which f0L is a function of 4-bit input and 8-bit output, the unmasking data generation unit 124-3k can perform ShiftRow processing on the data of 16 bytes including sixteen outputs of f0L. The unmasking data generation unit 124-3k outputs ShiftRow output values as inputs r10_0L to r10_15L to the unmask processing unit 125-3k.

The unmasking data generation unit 124-3k reads out $\Phi 0(x)$R to $\Phi 15(x)$R from the mask storage unit 131-3, and calculates the function f0R for each of the sixteen pieces of data of 4 bits that are read out. The mask conversion data generation unit 122-3k generates data of 16 bytes by causing the result of the function f0R to be lower-order 4 bits and causing higher-order 4 bits to be 0, and performs ShiftRow processing on the data. In a case in which f0R is a function of 4-bit input and 8-bit output, the unmasking data generation unit 124-3k can perform ShiftRow processing on data of 16 bytes including sixteen outputs of f0R. The unmasking data generation unit 124-3k outputs ShiftRow output values as inputs r10_0R to r10_15R of the mask conversion unit 128-3 for the next.

The unmasking data generation unit 124-3k performs calculation of r10_0L to r10_15L and calculation of r10_0R to r10_15R at different timings.

The unmask processing unit 125-3k receives inputs of the cipher text with a mask of 16 bytes, the pieces of unmasking data r10_0L to r10_15L, and the pieces of unmasking data r10_0R to r10_15R. The unmask processing unit 125-3k calculates an exclusive OR of the cipher text with a mask and the pieces of unmasking data r10_0L to r10_15L, calculates an exclusive OR of a result thereof and the pieces of unmasking data r10_0R to r10_15R, and inputs the cipher text as a result thereof to the output unit 101b.

Calculation order of the pieces of unmasking data r10_0L to r10_15L and the pieces of unmasking data r10_0R to r10_15R may be replaced with each other. The AddRoundKey processing may be performed after the unmask processing unit 125-3k.

The unmask processing unit 125-3k does not necessarily perform calculation of the pieces of unmasking data r10_0L to r10_15L and calculation of the pieces of unmasking data r10_0R to r10_15R at different timings. An exclusive OR of the pieces of unmasking data r10_0L to r10_15L and the pieces of unmasking data r10_0R to r10_15R of each byte may be calculated before the unmask processing unit 125-3k. In this case, the unmask processing unit 125-3k may calculate an exclusive OR of a result of the previous exclusive OR and the cipher text with a mask, and cause a result thereof to be cipher text.

Figure 19:
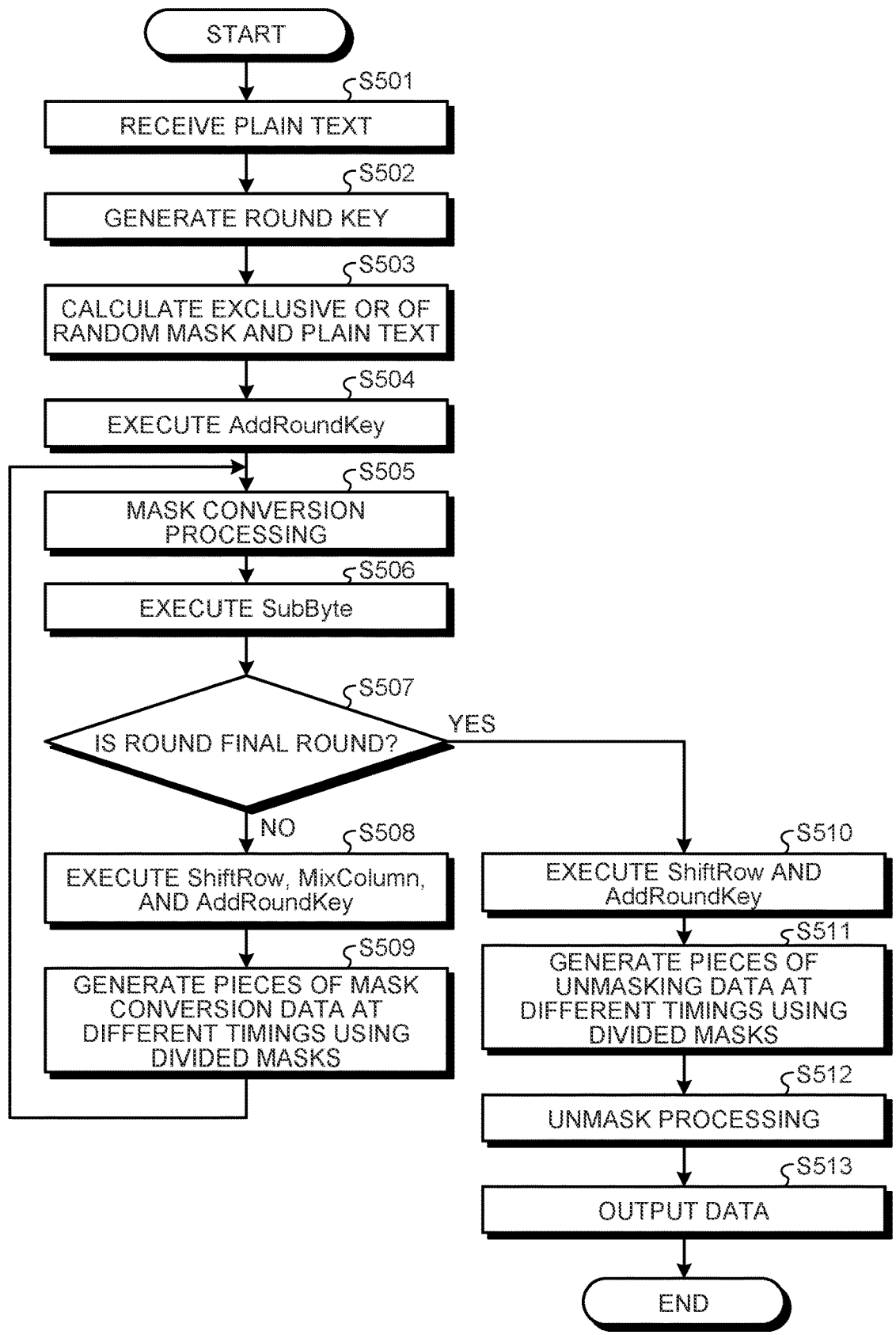
FIG. 19 is a flowchart of encoding processing in the third embodiment.

Next, the following describes the encoding processing performed by the encoding device according to the third embodiment that is configured as described above. FIG. 19 is a flowchart illustrating an example of the encoding processing in the third embodiment.

Step S501 to Step S504 are the same as Step S301 to Step S304 in FIG. 12 that illustrates the encoding processing of the second embodiment.

The mask conversion unit 128-3b converts the respective divided masks (the masks r0_0L to r0_15L, and the masks r0_0R to r0_15R) at different timings (Step S505).

The SubByte 105-3b receives an input of the intermediate data with a mask of 16 bytes as an output of the mask conversion unit 128-3b, and outputs an output value of the Sbox with a mask (Step S506).

The encoding device determines whether the round is the final round (Step S507). If the round is not the final round (No at Step S507), processing by the ShiftRow 106b, processing by the MixColumn 107b, and processing by the AddRoundKey 104b are performed in order (Step S508).

The mask conversion data generation unit 122-3b uses the divided masks ($\Phi 0(x)$L to $\Phi 15(x)$L, and $\Phi 0(x)$R to $\Phi 15(x)$R) to calculate and output the masks r1_0L to r1_15L and r1_0R to r1_15R to be used in the next mask conversion processing at different timings (Step S509). Thereafter, the process returns to Step S505, and the same processing is repeated for the next round.

If it is determined that the round is the final round at Step S507 (Yes at Step S507), processing of the final round is performed as follows.

First, processing by the ShiftRow 106k and processing by the AddRoundKey 104k are performed in order (Step S510). The unmasking data generation unit 124-3k uses the divided masks to calculate and output the pieces of unmasking data r10_0L to r10_15L and the pieces of unmasking data r10_0R to r10_15R at different timings (Step S511).

The unmask processing unit 125-3k performs unmask processing using the pieces of unmasking data r10_0L to r10_15L and unmask processing using the pieces of unmasking data r10_0R to r10_15R at different timings (Step S512). The output unit 110b outputs data as a processing result of the unmask processing unit 125-3k (Step S513), and ends the encoding processing.

Figure 20A:
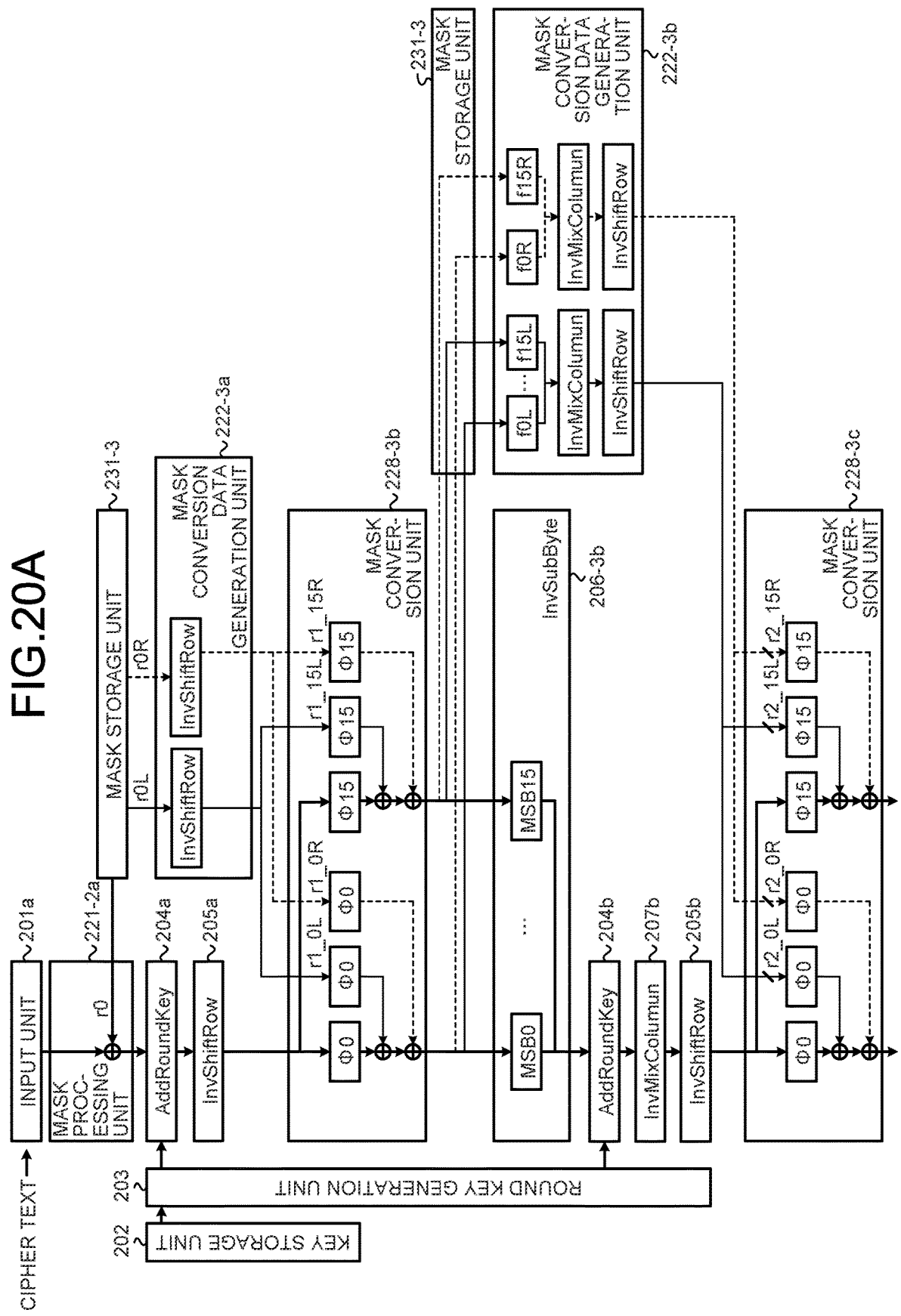
FIG. 20A is a block diagram of a decoding device according to the third embodiment.
Figure 20B:
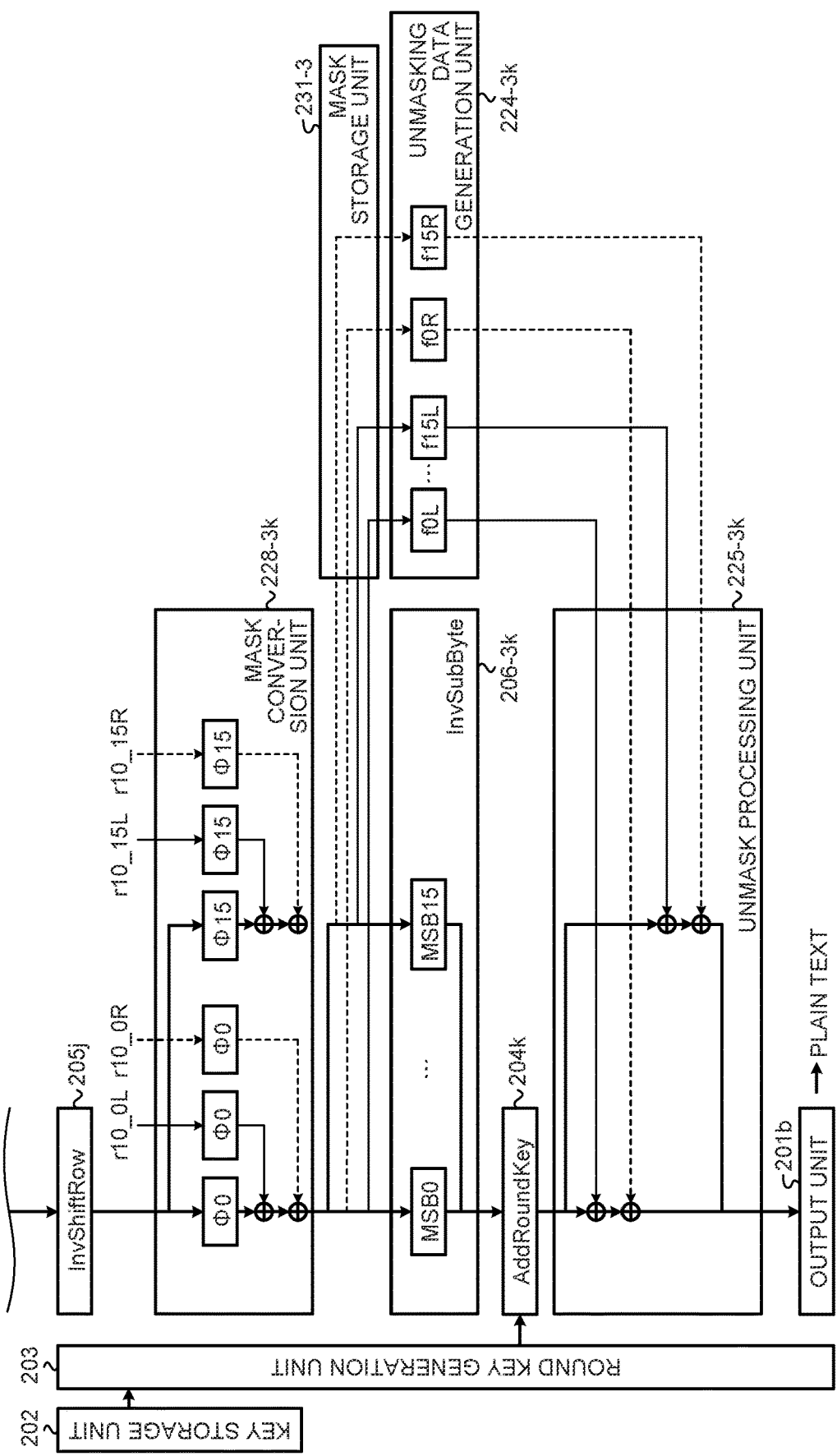
FIG. 20B is a block diagram of the decoding device according to the third embodiment.

Next, the following describes the decoding device according to the third embodiment. FIG. 20A and FIG. 20B are block diagrams illustrating an example of a configuration of the decoding device according to the present embodiment. The same configurations as those of the decoding device in the first embodiment and the second embodiment are denoted by the same reference numerals, and redundant description thereof will not be repeated.

The decoding device according to the third embodiment includes the input unit 201a, the output unit 201b, the key storage unit 202, the round key generation unit 203, the AddRoundKeys 204a to 204k, the InvShiftRows 205a to 205j, the InvSubBytes 206-3b to 206-3k, the InvMixColumns 207b to 207j, a mask storage unit 231-3, the mask processing unit 221-2a, an unmask processing unit 225-3k, mask conversion units 228-3b to 228-3k, and mask conversion data generation units 222-3b to 222-3j.

The mask storage unit 231-2, the mask processing unit 221-2a, and the mask conversion units 228-3b to 228-3k may respectively have the same configuration as that of the mask storage unit 131-3, the mask processing unit 121-2a, and the mask conversion units 128-3b to 128-3k of the encoding device.

The unmask processing unit 225-3k is different from the unmask processing unit 125-3k of the encoding device in that, in place of the pieces of unmasking data r10_0L to r10_15L and the pieces of unmasking data r10_0R to r10_15R, used is unmasking data that is calculated by the mask conversion data generation unit 222-3 based on the pieces of data.

The mask conversion data generation units 222-3b to 222-3j each include the InvMixColumn and the InvShiftRow in place of the ShiftRow and the MixColumn in the mask conversion data generation units 122-3b to 122-3j.

The configuration of the Sbox with a mask used in the SubByte 205-3 is the same as that of the Sbox with a mask used in the SubByte 105-3 of the encoding device except that the InvSbox is used in place of the Sbox.

Figure 21:
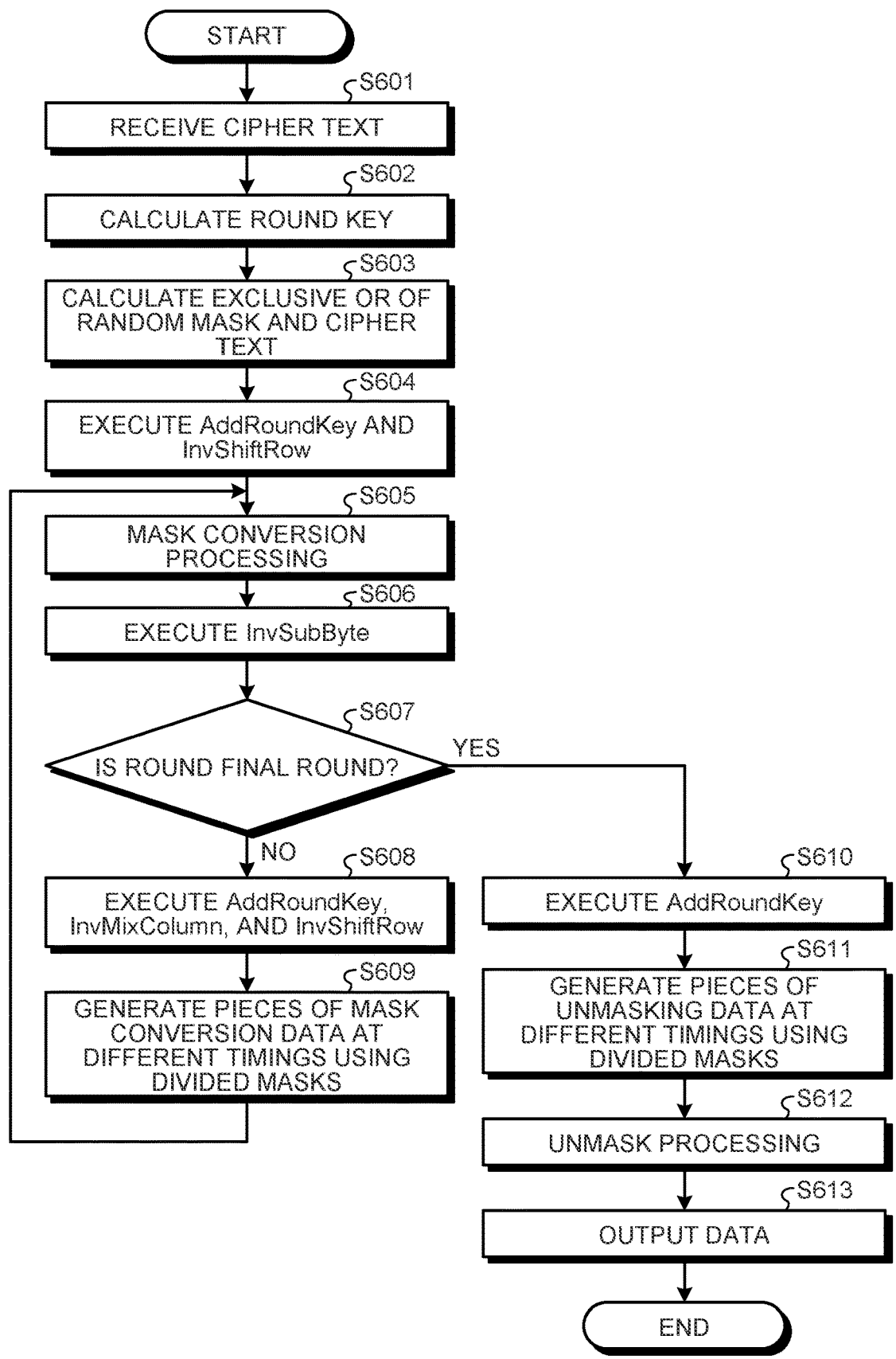
FIG. 21 is a flowchart of decoding processing in the third embodiment.

Next, the following describes decoding processing performed by the decoding device according to the third embodiment that is configured as described above. FIG. 21 is a flowchart illustrating an example of the decoding processing in the third embodiment.

Step S601 to Step S604 are the same as Step S401 to Step S404 in FIG. 15 that illustrates the decoding processing in the second embodiment.

The mask conversion unit 228-3b converts the respective divided masks (the masks r1_0L to r1_15L, and the masks r1_0R to r1_15R) at different timings (Step S605).

The InvSubByte 206-3b receives an input of the intermediate data with a mask of 16 bytes as an output of the AddRoundKey 204a, and outputs an output value of the Sbox with a mask (Step S606).

The decoding device determines whether the round is the final round (Step S607). If the round is not the final round (No at Step S607), processing by the AddRoundKey 204b, processing by the InvMixColumn 207b, and processing by the InvShiftRow 205b are performed in order (Step S608).

The mask conversion data generation unit 222-3b uses the divided masks ($\Phi 0(x)$L to $\Phi 15(x)$L, and $\Phi 0(x)$R to $\Phi 15(x)$R) to calculate and output the masks r2_0L to r2_15L and r2_0R to r2_15R to be used for the next mask conversion processing at different timings (Step S609). Thereafter, the process returns to Step S605, and the same processing is repeated for the next round.

If it is determined that the round is the final round at Step S607 (Yes at Step S607), processing of the final round is performed as follows.

First, processing is performed by the AddRoundKey 204k (Step S610). An unmasking data generation unit 224-3k uses the divided masks to calculate and output unmasking data for 4 bits on the left and unmasking data for 4 bits on the right at different timings (Step S611).

The unmask processing unit 225-3k performs unmask processing using the unmasking data for 4 bits on the left and unmask processing using the unmasking data for 4 bits on the right at different timings (Step S612). The output unit 110b outputs data as a result of the unmask processing (Step S613), and ends the decoding processing.

Modification

Execution order of a plurality of pieces of processing that are executed at different timings is not necessarily fixed, and may be randomly replaced with each other for execution of each piece of the encryption processing, for example. For example, in a case of a configuration of dividing the data into two parts, that is, 4 bits on the left and 4 bits on the right, which one thereof is executed first may be randomly determined. Processing order of a plurality of MixColumns (a plurality of InvMixColumns) included within the mask conversion data generation unit may be randomly determined.

Hardware Configuration

The respective units of the encryption processing device are implemented by one or more processors, for example. For example, the respective units described above may be implemented by causing a processor such as a central processing unit (CPU) to execute a computer program, that is, by software. The respective units described above may also be implemented by a processor such as a dedicated integrated circuit (IC), that is, by hardware. The respective units described above may also be implemented by both of software and hardware. In a case of using a plurality of processors, each of the processors may implement one of the units, or may implement two or more of the units.

In a case of implementing the units by hardware, the configuration may be made such that pieces of processing at different timings may be performed by different clocks.

Figure 22:
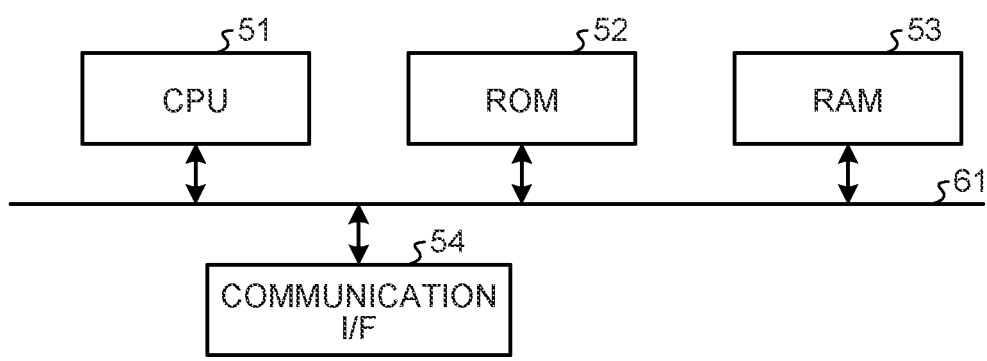
FIG. 22 is an explanatory diagram illustrating a hardware configuration example of the encryption processing device according to the first to the third embodiments.

Next, the following describes a hardware configuration of the encryption processing device according to the first to the third embodiments with reference to FIG. 22. FIG. 22 is an explanatory diagram illustrating a hardware configuration example of the encryption processing device according to the first to the third embodiments.

The encryption processing device according to the first to the third embodiments includes a control device such as a central processing unit (CPU) 51, a storage device such as a read only memory (ROM) 52 and a random access memory (RAM) 53, a communication I/F 54 that is connected to a network to perform communication, and a bus 61 for connecting the respective units.

A computer program executed by the encryption processing device according to the first to the third embodiments is embedded and provided in the ROM 52 and the like.

The computer program executed by the encryption processing device according to the first to the third embodiments may be recorded in a computer-readable recording medium such as a compact disc read only memory (CD-ROM), a flexible disk (FD), a compact disc recordable (CD-R), and a digital versatile disc (DVD), as an installable or executable file to be provided as a computer program product.

Furthermore, the computer program executed by the encryption processing device according to the first to the third embodiments may be stored in a computer connected to a network such as the Internet and provided by being downloaded via the network. The computer program executed by the encryption processing device according to the first to the third embodiments may be provided or distributed via a network such as the Internet.

The computer program executed by the encryption processing device according to the first to the third embodiments may cause a computer to function as each unit of the encryption processing device described above. In the computer, the CPU 51 can read out, from a computer-readable storage medium, a computer program to be executed in a main storage device.

As described above, according to the first to the third embodiments, the encryption processing device having resistance to power analysis including high-order DPA, CPA, and DLPA can be provided. According to the embodiments described above, a mask of 1 byte to be applied to intermediate data with a mask of 1 byte is divided to be stored and processed. Due to this, power values at a plurality of points are required to obtain information corresponding to the mask of 1 byte by power analysis. In the DPA and the CPA, a degree of attack is required to be raised, and cost for the attack is increased. In the DLPA, the number of input nodes is increased, so that it becomes difficult to search for hyperparameters, and cost for the attack is increased. In a case of replacing order of arithmetic operation of the divided masks between pieces of the encryption processing to be executed, power values at a plurality of points are required to obtain information corresponding to 1 bit in an attack focusing on a certain 1 bit, so that cost for the attack is increased. In this case, information that leaks to electric power at the certain point is different for each piece of the encryption processing to be executed. For example, information about a divided mask M1 leaks in the first encryption processing, and information about a divided mask M2 leaks in the second encryption processing. In a case of obtaining the information about the divided mask M1 from electric power at the certain point, the information about the divided mask M2 becomes noise, and it becomes difficult to perform an attack in a case of using electric power including much noise. A countermeasure can be implemented only by increasing the ShiftRow processing, the MixColumn processing, and the like without increasing the Sbox with a mask having a large memory region and without increasing an amount of random numbers that requires high cost. Due to this, a countermeasure against a side channel attack can be more efficiently implemented as compared with a countermeasure against the high-order DPA and a countermeasure against the CPA.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An encryption processing device comprising:
a memory configured to store a plurality of divided masks to be applied to target data of encryption processing including mask processing, the mask processing being performed in unit of data having a predetermined size, the divided masks each having a size obtained by dividing the predetermined size;
one or more processors configured to:
perform the encryption processing by repeating round processing based on a round function by a prescribed round number of times,
read out the plurality of divided masks from the memory at mutually different timings,
generate a plurality of first masks by using the read-out plurality of divided masks at mutually different timings;

execute arithmetic processing on intermediate data of the encryption processing by using the plurality of first masks at mutually different timings;

generate the plurality of first masks for converting a plurality of masks used in mask processing for the intermediate data of round processing in an i-th round, wherein i is an integral number equal to or larger than 1; and perform arithmetic processing on the intermediate data of round processing in the (i+1)-th round by using the plurality of first masks at mutually different timings.

2. The device according to claim 1, wherein
the one or more processors are further configured to:
store, as the divided masks in the memory, a plurality of calculation results based on the plurality of first masks used in the arithmetic processing for the intermediate data of round processing in an i-th round, wherein i is an integral number equal to or larger than 1; and read out the plurality of divided masks stored in the round processing in the i-th round from the memory at mutually different timings, and generate the plurality of first masks used in round processing in the (i+1)-th round by using the read-out plurality of divided masks at mutually different timings.

3. The device according to claim 1, wherein
the predetermined size is (8×L) bits, wherein L is an integral number equal to or larger than 1, and
the divided mask has a size obtained by dividing the predetermined size into two parts, four parts, or eight parts.

4. The device according to claim 1, wherein
the encryption processing and the target data include respectively
encoding processing and plain text, or
decoding processing and cipher text.

5. The device according to claim 1, wherein the one or more processors are configured to generate the plurality of first masks by using the plurality of divided masks in different order for each execution of the encryption processing.

6. The device according to claim 1, wherein the one or more processors are configured to perform arithmetic processing using the plurality of first masks in different order for each execution of the encryption processing.

7. The device according to claim 1, wherein
each of the plurality of first masks is generated by padding a plurality of bits of zero to one of the plurality of divided masks.

8. The device according to claim 1, wherein
the predetermined size is 8 bits,
a size of each of the plurality of divided masks is 4 bits, and
the one or more processors are configured to generate the plurality of first masks whose size is 8 bits, each of the plurality of first masks being generated by padding 4 bits of zero to one of the plurality of divided masks.

9. An encryption processing method comprising:
reading out, from a memory configured to store a plurality of divided masks to be applied to target data of encryption processing including mask processing, the plurality of divided masks at mutually different timings, the mask processing being performed in unit of data having a predetermined size, the divided masks each having a size obtained by dividing the predetermined size;

wherein the encryption processing repeats round processing based on a round function by a prescribed round number of times;

generating a plurality of first masks by using the read-out plurality of divided masks at mutually different timings;

executing arithmetic processing on intermediate data of the encryption processing by using the plurality of first masks at mutually different timings;

generating the plurality of first masks for converting a plurality of masks used in mask processing for the intermediate data of round processing in an i-th round, wherein i is an integral number equal to or larger than 1; and performing arithmetic processing on the intermediate data of round processing in the (i+1)-th round by using the plurality of first masks at mutually different timings.

10. A computer program product comprising a non-transitory computer-readable medium including programmed instructions, the instructions causing a computer to execute:
reading out, from a memory configured to store a plurality of divided masks to be applied to target data of encryption processing including mask processing, the plurality of divided masks at mutually different timings, the mask processing being performed in unit of data having a predetermined size, the divided masks each having a size obtained by dividing the predetermined size;

wherein the encryption processing repeats round processing based on a round function by a prescribed round number of times;

generating a plurality of first masks by using the read-out plurality of divided masks at mutually different timings;

executing arithmetic processing on intermediate data of the encryption processing by using the plurality of first masks at mutually different timings;

generating the plurality of first masks for converting a plurality of masks used in mask processing for the intermediate data of round processing in an i-th round, wherein i is an integral number equal to or larger than 1; and performing arithmetic processing on the intermediate data of round processing in the (i+1)-th round by using the plurality of first masks at mutually different timings.

* * * * *

UNITED STATES PATENT AND TRADEMARK OFFICE
CERTIFICATE OF CORRECTION

PATENT NO. : 11,587,467 B2
APPLICATION NO. : 17/181484
DATED : February 21, 2023
INVENTOR(S) : Tsukasa Omino It is certified that error appears in the above-identified patent and that said Letters Patent is hereby corrected as shown below:

On the Title Page

Item (57) Abstract, Lines 4-5, "in unit" should read as --in units--.

In the Claims

Claim 1, Column 28, Line 56, "in unit" should read as --in units--.

Claim 9, Column 30, Line 8, "in unit" should read as --in units--.

Claim 10, Column 30, Line 36, "in unit" should read as --in units--.

Signed and Sealed this
Fifth Day of September, 2023

Katherine Kelly Vidal
*Director of the United States Patent and Trademark Office*